US012755468B2

(12) United States Patent
Bereznyak

(10) Patent No.: US 12,755,468 B2
(45) Date of Patent: Oct. 6, 2026

(54) SYSTEMS AND METHODS FOR ENABLING ANIMATION OF A SECONDARY ASSET IN ONLINE MULTI-PLAYER VIDEO GAMES

(71) Applicant: Activision Publishing, Inc., Santa Monica, CA (US)

(72) Inventor: Alexander Bereznyak, Georgetown, TX (US)

(73) Assignee: Activision Publishing, Inc., Santa Monica, CA (US)

( * ) Notice: Subject to any disclaimer, the term of this patent is extended or adjusted under 35 U.S.C. 154(b) by 31 days.

(21) Appl. No.: 18/927,437

(22) Filed: Oct. 25, 2024

(65) Prior Publication Data

US 2026/0024263 A1 Jan. 22, 2026

Related U.S. Application Data

(60) Provisional application No. 63/689,321, filed on Aug. 30, 2024, provisional application No. 63/673,256, filed on Jul. 19, 2024.

(51) Int. Cl.

| | |
|---|---|
| ***G06T 13/40*** | (2011.01) |
| ***A63F 13/55*** | (2014.01) |
| ***G06T 17/20*** | (2006.01) |

(52) U.S. Cl.

CPC .............. *G06T 13/40* (2013.01); *A63F 13/55* (2014.09); *G06T 17/20* (2013.01)

(58) Field of Classification Search

None

See application file for complete search history.

(56) References Cited

U.S. PATENT DOCUMENTS

| | | | |
|---|---|---|---|
| 5,530,796 | A | 6/1996 | Wang |
| 5,561,736 | A | 10/1996 | Moore |
| 5,563,946 | A | 10/1996 | Cooper |
| 5,685,775 | A | 11/1997 | Bakoglu |
| 5,706,507 | A | 1/1998 | Schloss |
| 5,708,764 | A | 1/1998 | Borrel |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Non-Final office Action mailed on May 26, 2026, in U.S. Appl. No. 18/927,297 10 pages.

*Primary Examiner* — Nurun Flora
(74) *Attorney, Agent, or Firm* — Novel IP

(57) ABSTRACT

Systems and methods for constructing an offline graph structure configured to enable controlled character motion synthesis in a multi-player online gaming include a graph structure that has a plurality of master nodes and edges such that each master node is representative of a set of similar dominant poses and edges are representative of plausible transitions between these dominant poses. Motion is generated at runtime by navigating through the graph structure and applying dominant poses from the plurality of master nodes. Since, an online game describes a desired motion of a character using a plurality of control parameters therefore, transitions that match the plurality of control parameters most closely are selected from the graph structure.

24 Claims, 20 Drawing Sheets

(56) References Cited

U.S. PATENT DOCUMENTS

| | | | |
|---|---|---|---|
| 5,736,985 | A | 4/1998 | Lection |
| 5,737,416 | A | 4/1998 | Cooper |
| 5,745,678 | A | 4/1998 | Herzberg |
| 5,768,511 | A | 6/1998 | Galvin |
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,525,731 | B1 | 2/2003 | Suits |
| 6,549,933 | B1 | 4/2003 | Barrett |
| 6,567,109 | B1 | 5/2003 | Todd |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D Amora |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,001,161 | B2 | 8/2011 | Finn |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |

(56) References Cited

U.S. PATENT DOCUMENTS 8,019,797 B2 9/2011 Hamilton, II
8,019,858 B2 9/2011 Bauchot
8,022,948 B2 9/2011 Garbow
8,022,950 B2 9/2011 Brown
8,026,913 B2 9/2011 Garbow
8,028,021 B2 9/2011 Reisinger
8,028,022 B2 9/2011 Brownholtz
8,037,416 B2 10/2011 Bates
8,041,614 B2 10/2011 Bhogal
8,046,700 B2 10/2011 Bates
8,051,462 B2 11/2011 Hamilton, II
8,055,656 B2 11/2011 Cradick
8,056,121 B2 11/2011 Hamilton, II
8,057,307 B2 11/2011 Berstis
8,062,130 B2 11/2011 Smith
8,063,905 B2 11/2011 Brown
8,070,601 B2 12/2011 Acharya
8,082,245 B2 12/2011 Bates
8,085,267 B2 12/2011 Brown
8,089,481 B2 1/2012 Shearer
8,092,288 B2 1/2012 Theis
8,095,881 B2 1/2012 Reisinger
8,099,338 B2 1/2012 Betzler
8,099,668 B2 1/2012 Garbow
8,102,334 B2 1/2012 Brown
8,103,640 B2 1/2012 Lo
8,103,959 B2 1/2012 Cannon
8,105,165 B2 1/2012 Karstens
8,108,774 B2 1/2012 Finn
8,113,959 B2 2/2012 De Judicibus
8,117,551 B2 2/2012 Cheng
8,125,485 B2 2/2012 Brown
8,127,235 B2 2/2012 Haggar
8,127,236 B2 2/2012 Hamilton, II
8,128,487 B2 3/2012 Hamilton, II
8,131,740 B2 3/2012 Cradick
8,132,235 B2 3/2012 Bussani
8,134,560 B2 3/2012 Bates
8,139,060 B2 3/2012 Brown
8,139,780 B2 3/2012 Shearer
8,140,340 B2 3/2012 Bhogal
8,140,620 B2 3/2012 Creamer
8,140,978 B2 3/2012 Betzler
8,140,982 B2 3/2012 Hamilton, II
8,145,676 B2 3/2012 Bhogal
8,145,725 B2 3/2012 Dawson
8,149,241 B2 4/2012 Do
8,151,191 B2 4/2012 Nicol, II
8,156,184 B2 4/2012 Kurata
8,165,350 B2 4/2012 Fuhrmann
8,171,407 B2 5/2012 Huang
8,171,408 B2 5/2012 Dawson
8,171,559 B2 5/2012 Hamilton, II
8,174,541 B2 5/2012 Greene
8,176,421 B2 5/2012 Dawson
8,176,422 B2 5/2012 Bergman
8,184,092 B2 5/2012 Cox
8,184,116 B2 5/2012 Finn
8,185,450 B2 5/2012 Mcvey
8,185,829 B2 5/2012 Cannon
8,187,067 B2 5/2012 Hamilton, II
8,199,145 B2 6/2012 Hamilton, II
8,203,561 B2 6/2012 Carter
8,214,335 B2 7/2012 Hamilton, II
8,214,433 B2 7/2012 Dawson
8,214,750 B2 7/2012 Hamilton, II
8,214,751 B2 7/2012 Dawson
8,217,953 B2 7/2012 Comparan
8,219,616 B2 7/2012 Dawson
8,230,045 B2 7/2012 Kawachiya
8,230,338 B2 7/2012 Dugan
8,233,005 B2 7/2012 Finn
8,234,234 B2 7/2012 Shearer
8,234,579 B2 7/2012 Do
8,239,775 B2 8/2012 Beverland
8,241,131 B2 8/2012 Bhogal
8,245,241 B2 8/2012 Hamilton, II
8,245,283 B2 8/2012 Dawson
8,265,253 B2 9/2012 D Amora
8,310,497 B2 11/2012 Comparan
8,334,871 B2 12/2012 Hamilton, II
8,360,886 B2 1/2013 Karstens
8,364,804 B2 1/2013 Childress
8,425,326 B2 4/2013 Chudley
8,442,946 B2 5/2013 Hamilton, II
8,456,476 B1 6/2013 Kovar
8,506,372 B2 8/2013 Chudley
8,514,249 B2 8/2013 Hamilton, II
8,554,841 B2 10/2013 Kurata
8,607,142 B2 12/2013 Bergman
8,607,356 B2 12/2013 Hamilton, II
8,624,903 B2 1/2014 Hamilton, II
8,626,836 B2 1/2014 Dawson
8,692,835 B2 4/2014 Hamilton, II
8,721,412 B2 5/2014 Chudley
8,827,816 B2 9/2014 Bhogal
8,838,640 B2 9/2014 Bates
8,849,917 B2 9/2014 Dawson
8,911,296 B2 12/2014 Chudley
8,992,316 B2 3/2015 Smith
9,083,654 B2 7/2015 Dawson
9,152,914 B2 10/2015 Haggar
9,205,328 B2 12/2015 Bansi
9,286,731 B2 3/2016 Hamilton, II
9,299,080 B2 3/2016 Dawson
9,364,746 B2 6/2016 Chudley
9,525,746 B2 12/2016 Bates
9,583,109 B2 2/2017 Kurata
9,682,324 B2 6/2017 Bansi
9,764,244 B2 9/2017 Bansi
9,789,406 B2 10/2017 Marr
9,808,722 B2 11/2017 Kawachiya
9,827,496 B1 11/2017 Zinno
10,032,305 B2 7/2018 West
10,717,004 B2 7/2020 Buttner
10,885,691 B1 1/2021 Parker
11,123,636 B2 9/2021 Sherr
11,670,030 B2 * 6/2023 Shi .......................... G06T 7/246
345/474
11,972,353 B2 4/2024 Zinno
12,444,115 B2 10/2025 Starke
2009/0113448 A1 4/2009 Smith
2014/0344725 A1 11/2014 Bates
2016/0019708 A1 1/2016 Moll
2016/0191671 A1 6/2016 Dawson
2017/0209795 A1 7/2017 Harvey
2017/0266491 A1 9/2017 Rissanen
2020/0058137 A1 * 2/2020 Pujades .................. G06V 40/23
2021/0158565 A1 5/2021 Li
2021/0158593 A1 5/2021 Li
2021/0209770 A1 7/2021 Kamyshanska
2021/0308580 A1 * 10/2021 Akhoundi ............ G06N 3/0475
2022/0035443 A1 * 2/2022 Winold ................... G06F 3/017
2022/0157000 A1 5/2022 Assouline
2022/0165012 A1 5/2022 Andrew
2022/0335625 A1 10/2022 Shimizu
2023/0033290 A1 2/2023 Starke
2023/0186541 A1 * 6/2023 Starke ..................... A63F 13/56
2023/0215043 A1 7/2023 Zhang
2023/0310998 A1 10/2023 Starke
2024/0346685 A1 10/2024 Nguyen
2025/0005965 A1 * 1/2025 Weiss ..................... G06V 40/23
2025/0182364 A1 6/2025 Akhoundi
2026/0021402 A1 1/2026 Bereznyak
2026/0021403 A1 1/2026 Bereznyak

FOREIGN PATENT DOCUMENTS

CA 2143874 6/2000
CA 2292678 7/2005
CA 2552135 7/2013
CN 1334650 A 2/2002
CN 1202652 C 10/2002
CN 1141641 C 3/2004

(56) References Cited

FOREIGN PATENT DOCUMENTS

| | | | |
|---|---|---|---|
| CN | 1494679 | A | 5/2004 |
| CN | 1219384 | | 9/2005 |
| CN | 1307544 | | 3/2007 |
| CN | 100407675 | | 7/2008 |
| CN | 100423016 | C | 10/2008 |
| CN | 100557637 | | 11/2009 |
| CN | 101001678 | B | 5/2010 |
| CN | 101436242 | | 12/2010 |
| CN | 101801482 | B | 12/2014 |
| EP | 668583 | | 8/1995 |
| EP | 0627728 | B1 | 9/2000 |
| EP | 0717337 | B1 | 8/2001 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |
| GB | 2339938 | | 10/2002 |
| GB | 2352154 | | 7/2003 |
| JP | 3033956 | B2 | 4/2000 |
| JP | 3124916 | B2 | 1/2001 |
| JP | 3177221 | B2 | 6/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| MY | 117864 | A | 8/2004 |
| SG | 55396 | | 12/1998 |
| WO | 2002073457 | | 9/2002 |
| WO | 20020087156 | | 10/2002 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

* cited by examiner

1002

SYSTEMS AND METHODS FOR ENABLING ANIMATION OF A SECONDARY ASSET IN ONLINE MULTI-PLAYER VIDEO GAMES

CROSS-REFERENCE

The present specification relies on U.S. Patent Provisional Application No. 63/673,256, titled "Systems and Methods for Enabling Controlled Character Motion Synthesis in Online Multi-Player Video Games", and filed on Jul. 19, 2024, for priority. The present specification also relies on U.S. Patent Provisional Application No. 63/689,321, titled "Systems and Methods for Enabling Animation of a Secondary Asset in Online Multi-Player Video Games", and filed on Aug. 30, 2024, for priority. The above-mentioned applications are herein incorporated by reference in their entirety.

FIELD

The present specification is related generally to the field of character animation or digital human animation. More specifically, the present specification is related to systems and methods for using a graph structure to generate a sequence of motions for runtime or offline usage for realistic character animation or digital human animation.

BACKGROUND

Realistic human motion is a desirable feature in video games to enable stunning graphics and impactful special effects. Lifelike characters provide an immersive environment for players. However, realistic animation of human motion is challenging as players and spectators are adept at identifying subtleties of human movement and therefore inaccuracies in human animation.

There are various popular methods for animating interactively controlled player characters or game objects in video games. For example, interactive control of animated characters or game objects may be accomplished by relying on transitioning between predefined animations (often clips of motion capture) based on user input. For example, the character may transition from walking to a running animation, and then jump over an obstacle while running. To define transitions between animations, a common approach is the use of state graphs, also called animation state machines (ASM), defining actions as states and connections between states representing transition times.

However, the use of ASM has several disadvantages. First, the realism of motion suffers since an animator may only be able to conceive of a limited number of clips (X) while achieving realism requires a far greater number, for example, on the order of X2. Second, ASM does not scale well since any new interaction requires a number of entry and exit points to connect with the data, the creation of which scales geometrically. Third, ASM motion will continuously achieve the same poses from the core library, introducing a tiling effect over time that is similar to texture tiling over space. Fourth, ASM usually has to rely on blend spaces, such as vertical blends of a character's upper and lower body, and procedural add-ons, such as leaning, to add versatility beyond what humans can do. Fifth, since reactivity is based on human-driven clip duration, animators must either opt into sudden ugly blends or manually tag blend windows. Sixth, ASM has no built-in context or history and yet is still very data hungry (meaning that it requires large amounts of input data).

Motion graphs are constructed by pre-calculating transitions between animation segments within a large set of animation data typically obtained from motion capture. Each node of the motion graph represents a sequence of animation, with the graph edges representing transitions. At runtime, the animation segment represented by the current node is played to completion, at which point a transition is taken to a new node that satisfies the desired animation goals. The motion produced is typically high quality, as a result of the flexibility of being able to choose from multiple possible motion paths using the graph structure. One disadvantage is that the use of animation clips tends to make motion graphs less responsive to changing animation goals, which is often the case for interactively controlled player characters in video games.

Motion matching solves this problem by continuously searching the entire animation dataset for a next frame that best fits the current desired animation goals. Quality may be balanced against responsiveness by adjusting the cost function used to identify the best next frame match. The downside of this approach is that it can be hard to predict and control which animation data will be selected at any given time. Newly introduced or modified animation data intended to improve one area of motion may also negatively affect others, which can lead to a reluctance to make changes as the animation database grows. Solving these issues usually involves adding further complexity, such as restricting motion matching to subsets of the animation database at different times.

Current approaches lack the requisite fidelity to produce realistic characters moving in tight spaces, characters interacting with obstacles, and other types of characters. These approaches are best for solving for singular constraints (such as achieving target transform in space-time) and are not agile enough to achieve multiple constraints (for example multitasking such as walking around an obstacle while moving to a specific rhythm and face-palming every 3$^{rd}$ step).

Accordingly, there is a need for improved systems and methods for pre-processing motion capture data to generate a graph structure which can be leveraged at runtime to find the best possible motion to synthesize for any set of animation goals.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a computer-implemented method of generating a graph structure configured to enable a synthesis of character motion in a multi-player online video game, the method comprising: receiving motion capture data; identifying a plurality of dominant poses from motion capture data; comparing each dominant pose of the plurality of dominant poses against each remaining ones of the plurality of dominant poses; grouping the dominant poses to form one or more master pose nodes, wherein the dominant poses in each of the one or more master pose nodes are indicative of similar motion over a time window; adding a plurality of transitions based on successive dominant poses present in each master pose node, wherein each of the plurality of transitions represents pairs of dominant poses that are sufficiently similar for selection in an animation sequence; calculating shape, mesh, UVs and skin corresponding to a secondary asset associated with the character; calculating and storing inverse blend shapes and normal maps for the plurality of dominant poses; storing the inverse blend shapes and normal maps per build, per gaming level or per platform; and invoking and applying, at runtime, the stored inverse blend shapes and normal maps with metadata from the plurality of dominant poses to mesh and shader in desired proportions or weights.

Optionally, said identifying the plurality of dominant poses is achieved by sampling the motion capture data to determine poses associated with different positions along a force curve and wherein those poses corresponding to maximum and minimum values of the force curve are identified as said dominant poses.

Optionally, the comparison is based on a similarity metric calculated over a fixed time window centered at each dominant pose.

Optionally, the similarity metric is a comparison cost value.

Optionally, each of the plurality of transitions comprises a Root transform offset and a duration.

Optionally, the motion capture data is derived from the plurality of dominant poses by extrapolating a force curve across the plurality of dominant poses.

Optionally, the computer-implemented method further comprises generating motion in the multi-player online video game at runtime by applying one or more of the plurality of dominant poses from the one or more master nodes and by applying one or more of the plurality of transitions that match a plurality of control parameters, wherein the plurality of control parameters define a desired motion of a character in the multi-player online video game.

Optionally, the computer-implemented method further comprises storing data for each of the one or more master pose nodes, wherein the data comprises at least one of dominant poses, weights associated with each of the dominant poses, poses preceding said each of the one or more master pose nodes, a cost of blending said preceding poses, poses succeeding each of the one or more master pose nodes, costs of blending said succeeding poses, and one or more metadata.

Optionally, for the computer-implemented method, calculating the mesh comprises: sampling a high polygon cloth mesh by either using vertices of the high polygon cloth mesh or if the cloth mesh has UVs then using its pixels mapped to geometry; for each dominant pose, determining geometric curvature per sample; collapsing the geometric curvature at the plurality of dominant poses to a single value per sample; and generating a low polygon game mesh using the single value.

Optionally, for the computer-implemented method, calculating the shape and skin comprises determining, for each vertex of the mesh, closest vertices of body mesh at each dominant pose; eliminating all body vertices, at each dominant pose, that are farther away than a maximum distance of any mesh vertex to any body vertex in order to generate a relevant subset of body vertices; accumulating, for each mesh vertex at each dominant pose, joint weights of each body vertex in the relevant subset of body vertices and weighting each result; storing an offset of mesh vertex from respective joints as a vector in respective joint space with weight; collapsing all the weights in order to determine, for each mesh vertex, a set of joints and weights affecting it and offset from each; and determining the location for each mesh vertex by taking a weighted average of offsets from joints at skin pose.

Optionally, for the computer-implemented method, calculating the UVs comprises generating UV seams for the mesh; and relaxing the UVs for each dominant pose.

Optionally, an inverse blend shape is a set of vertex transforms which, if applied to a pose pre-skin deformation, allows subsequently skinned vertices to achieve desired character space locations, and wherein a normal map is a texture that stores, per pixel, data of normal vector deviation between a low-resolution mesh and a high-resolution mesh.

Optionally, an example of the metadata comprises a baked distance to body texture maps.

Optionally, the stored inverse blend shapes and normal maps are applied vertices of the mesh are offset using respective inverse blend shapes to reflect volume detail and normal maps are blended to reflect surface detail.

In some embodiments, the present specification discloses a system of generating a graph structure configured to enable a synthesis of character motion in a multi-player online video game, the system comprising: at least one game server in communication with a plurality of player client devices, wherein the at least one game server has a non-volatile memory for storing a plurality of programmatic code which, when executed, cause a processor to: receive motion capture data; identify a plurality of dominant poses from the motion capture data; compare each dominant pose of the plurality of dominant poses against each remaining ones of the plurality of dominant poses; group the dominant poses to form one or more master pose nodes, wherein the dominant poses in each of the one or more master pose nodes are indicative of similar motion over a time window; add a plurality of transitions based on successive dominant poses present in each master pose node, wherein each of the plurality of transitions represents pairs of dominant poses that are sufficiently similar for selection in an animation sequence; calculate shape, mesh, UVs and skin corresponding to a secondary asset associated with the character; calculate and store inverse blend shapes and normal maps for the plurality of dominant poses; store the inverse blend shapes and normal maps per build, per game level or per platform; and invoke and apply, at runtime, the stored inverse blend shapes and normal maps with metadata from the plurality of dominant poses to mesh and shader in desired proportions or weights.

Optionally, said identifying the plurality of dominant poses is achieved by sampling the motion capture data to determine poses associated with different positions along a force curve and wherein those poses corresponding to maximum and minimum values of the force curve are identified as said dominant poses.

Optionally, the comparison is based on a similarity metric calculated over a fixed time window centered at each dominant pose.

Optionally, the similarity is a comparison cost value.

Optionally, each of the plurality of transitions comprises Root transform offset and a duration.

Optionally, the motion capture data can be derived from the plurality of dominant poses by extrapolating a force curve across the plurality of dominant poses.

Optionally, the plurality of programmatic code, when executed, further cause the processor to generate motion in the multi-layer online video game at runtime by applying one or more of the plurality of dominant poses from the one or more master nodes and by applying one or more of the plurality of transitions that match a plurality of control parameters, wherein the plurality of control parameters define a desired motion of a character in the multi-player online video game.

Optionally, the system is configured to store data for each of the one or more master pose nodes, wherein the data comprises at least one of dominant poses, weights associated with each of the dominant poses, poses preceding said each of the one or more master pose nodes, a cost of blending said preceding poses, poses succeeding each of the one or more master pose nodes, costs of blending said succeeding poses, and one or more metadata.

Optionally, the system is configured to calculate the mesh sampling a high polygon cloth mesh by either using vertices of the high polygon cloth mesh or if the cloth mesh has UVs then using its pixels mapped to geometry; for each dominant pose, determining geometric curvature per sample; collapsing the geometric curvature at the plurality of dominant poses to a single value per sample; and generating a low polygon game mesh using the single value.

Optionally, the system is configured to calculate the shape and skin by determining, for each vertex of the mesh, closest vertices of body mesh at each dominant pose; eliminating all body vertices, at each dominant pose, that are farther away than a maximum distance of any mesh vertex to any body vertex in order to generate a relevant subset of body vertices; accumulating, for each mesh vertex at each dominant pose, joint weights of each body vertex in the relevant subset of body vertices and weighting each result; storing an offset of mesh vertex from respective joints as a vector in respective joint space with weight; collapsing all the weights in order to determine, for each mesh vertex, a set of joints and weights affecting it and offset from each; and, determining the location for each mesh vertex by taking weighted average of offsets from joints at skin pose.

Optionally, the system is configured to calculate UVs by generating UV seams for the mesh; and relaxing the UVs for each dominant pose.

Optionally, an inverse blend shape is a set of vertex transforms which, if applied to a pose pre-skin deformation, allows subsequently skinned vertices to achieve desired character space locations, and wherein a normal map is a texture that stores, per pixel, data of normal vector deviation between a low-resolution mesh and a high-resolution mesh.

Optionally, an example of the metadata comprises a baked distance to body texture maps.

Optionally, when the stored inverse blend shapes and normal maps are applied, vertices of the mesh are offset using respective inverse blend shapes to reflect volume detail and normal maps are blended to reflect surface detail.

In some embodiments, the present specification is directed towards a method of generating a graph structure, comprising: receiving motion capture data; identifying a plurality of dominant poses from the motion capture data; comparing each dominant pose of the plurality of dominant poses against each remaining ones of the plurality of dominant poses, wherein the comparison is based on a similarity metric calculated over a fixed time window centered at each dominant pose; grouping the dominant poses to form one or more master pose nodes, wherein the grouped dominant poses have transition cost values below a predefined threshold; adding a plurality of transitions based on successive dominant poses present in each master pose node, wherein each of the plurality of transitions represents pairs of dominant poses that are sufficiently similar for selection in an animation sequence; calculating shape, mesh, UVs and skin corresponding to a secondary asset associated with an animated character; calculating and storing inverse blend shapes and normal maps for the plurality of dominant poses; storing the inverse blend shapes and normal maps per build, per gaming level or per platform; and invoking and applying, at runtime, the stored inverse blend shapes and normal maps with metadata from the plurality of dominant poses to mesh and shader in desired proportions or weights.

Optionally, said identifying the plurality of dominant poses is achieved by sampling the motion capture data to determine poses associated with different positions along a force curve and wherein those poses corresponding to maximum and minimum values of the force curve are identified as said dominant poses.

Optionally, each of the plurality of transitions comprises Root transform offset and a duration.

Optionally, the motion capture data is derived from the plurality of dominant poses by extrapolating a force curve across the plurality of dominant poses.

Optionally, the method further comprises generating motion in the multi-player online video game at runtime by applying one or more of the plurality of dominant poses from the one or more master nodes and by applying one or more of the plurality of transitions that match a plurality of control parameters, wherein the plurality of control parameters define a desired motion of a character in the multi-player online video game.

Optionally, the method further comprises storing data for each of the one or more master pose nodes, wherein the data comprises at least one of dominant poses, weights associated with each of the dominant poses, poses preceding said each of the one or more master pose nodes, a cost of blending said preceding poses, poses succeeding each of the one or more master pose nodes, costs of blending said succeeding poses, and one or more metadata.

Optionally, the similarity metric is a comparison cost value.

Optionally, the mesh is calculated by: sampling a high polygon cloth mesh by either using vertices of the high polygon cloth mesh or if the cloth mesh has UVs then using its pixels mapped to geometry; for each dominant pose, determining geometric curvature per sample; collapsing the geometric curvature at the plurality of dominant poses to a single value per sample; and generating a low polygon game mesh using the single value.

Optionally, the shape and skin are calculated by: determining, for each vertex of the mesh, closest vertices of body mesh at each dominant pose; eliminating all body vertices, at each dominant pose, that are farther away than a maximum distance of any mesh vertex to any body vertex in order to generate a relevant subset of body vertices; accumulating, for each mesh vertex at each dominant pose, joint weights of each body vertex in the relevant subset of body vertices and weighting each result; storing an offset of mesh vertex from respective joints as a vector in respective joint space with weight; collapsing all the weights in order to determine, for each mesh vertex, a set of joints and weights affecting it and offset from each; and determining the location for each mesh vertex by taking weighted average of offsets from joints at skin pose.

Optionally, the UVs are calculated by: generating UV seams for the mesh; and relaxing the UVs for each dominant pose.

Optionally, an inverse blend shape is a set of vertex transforms which, if applied to a pose pre-skin deformation, allows subsequently skinned vertices to achieve desired character space locations, and wherein a normal map is a texture that stores, per pixel, data of normal vector deviation between a low-resolution mesh and a high-resolution mesh.

Optionally, an example of the metadata comprises a baked distance to body texture maps.

Optionally, when the stored inverse blend shapes and normal maps are applied, vertices of the mesh are offset using respective inverse blend shapes to reflect volume detail and normal maps are blended to reflect surface detail.

The present specification discloses a computer-implemented method of generating a graph structure configured to enable controlled character motion synthesis in a multi-player online gaming system, the method comprising: identifying, from a corpus of motion capture data, a subset of artistically relevant dominant poses; comparing each of the identified subset of dominant poses against the remaining subset of dominant poses; grouping the dominant poses, indicative of similar motion over a time window, to form one or more master pose nodes; and adding a plurality of transitions based on successive dominant poses present in each master pose node.

Optionally, the motion capture data is sampled using a measurement of force invested, wherein poses corresponding to values of peaks and valleys of a force curve are identified as dominant poses.

Optionally, the comparison is based on a similarity metric calculated over a fixed time window centered at each dominant pose.

Optionally, each of the plurality of transitions includes Root transform offset and a duration.

Optionally, the dominant poses are indicative of a minimal set which can be used to rebuild the whole motion capture data.

Optionally, the method further comprises generating motion at runtime by applying one or more dominant poses from the one or more master nodes and by applying one or more transitions that match a plurality of control parameters, wherein the plurality of control parameters describe a desired motion of a character in a multi-player online game.

Optionally, for each of the one or more master pose nodes, at least following data is stored: a list of dominant poses affected, including weights; a list of incoming master poses (predecessors on a timeline) with costs of blending; a list of outgoing master poses (successors on the timeline) with costs of blending; or one or more metadata to serve as tags.

The present specification also discloses a system for generating a graph structure configured to enable controlled character motion synthesis in a multi-player online game, the system comprising: at least one game server in communication with a plurality of player client devices, wherein the at least one game server has a non-volatile memory for storing a plurality of programmatic code which, when executed, cause a processor to: identify, from a corpus of motion capture data, a subset of artistically relevant dominant poses; compare each of the identified subset of dominant poses against the remaining subset of dominant poses; group the dominant poses, indicative of similar motion over a time window, to form one or more master pose nodes; and add a plurality of transitions based on successive dominant poses present in each master pose node.

Optionally, the motion capture data is sampled using a measurement of force invested, wherein poses corresponding to values of peaks and valleys of a force curve are identified as dominant poses.

Optionally, the comparison is based on a similarity metric calculated over a fixed time window centered at each dominant pose.

Optionally, each of the plurality of transitions includes Root transform offset and a duration.

Optionally, the dominant poses are indicative of a minimal set which can be used to rebuild the whole motion capture data.

Optionally, the plurality of programmatic code which, when executed, further causes the processor to generate motion at runtime by applying one or more dominant poses from the one or more master nodes and by applying one or more transitions that match a plurality of control parameters, wherein the plurality of control parameters describe a desired motion of a character in the multi-player online game.

Optionally, for each of the one or more master pose nodes, at least following data is stored: a list of dominant poses affected, including weights; a list of incoming master poses (predecessors on a timeline) with costs of blending; a list of outgoing master poses (successors on the timeline) with costs of blending; or, one or more metadata to serve as tags.

The present specification also discloses a method of generating a graph structure, comprising: identifying, from a corpus of motion capture data, a subset of artistically relevant dominant poses; comparing each of the identified subset of dominant poses against the remaining subset of dominant poses, wherein the comparison is based on a similarity metric calculated over a fixed time window centered at each dominant pose; grouping the dominant poses, having transition cost values below a predefined threshold, to form one or more master pose nodes; and adding a plurality of transitions based on successive dominant poses present in each master pose node.

Optionally, the motion capture data is sampled using a measurement of force invested, wherein poses corresponding to values of peaks and valleys of a force curve are identified as dominant poses.

Optionally, each of the plurality of transitions includes Root transform offset and a duration.

Optionally, the dominant poses are indicative of a minimal set which can be used to rebuild the whole motion capture data.

Optionally, the method further comprises generating motion at runtime by applying one or more dominant poses from the one or more master nodes and by applying one or more transitions that match a plurality of control parameters, wherein the plurality of control parameters describe a desired motion of a character in a multi-player online game.

Optionally, for each of the one or more master pose nodes, at least following data is stored: a list of dominant poses affected, including weights; a list of incoming master poses (predecessors on a timeline) with costs of blending; a list of outgoing master poses (successors on the timeline) with costs of blending; or, one or more metadata to serve as tags.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
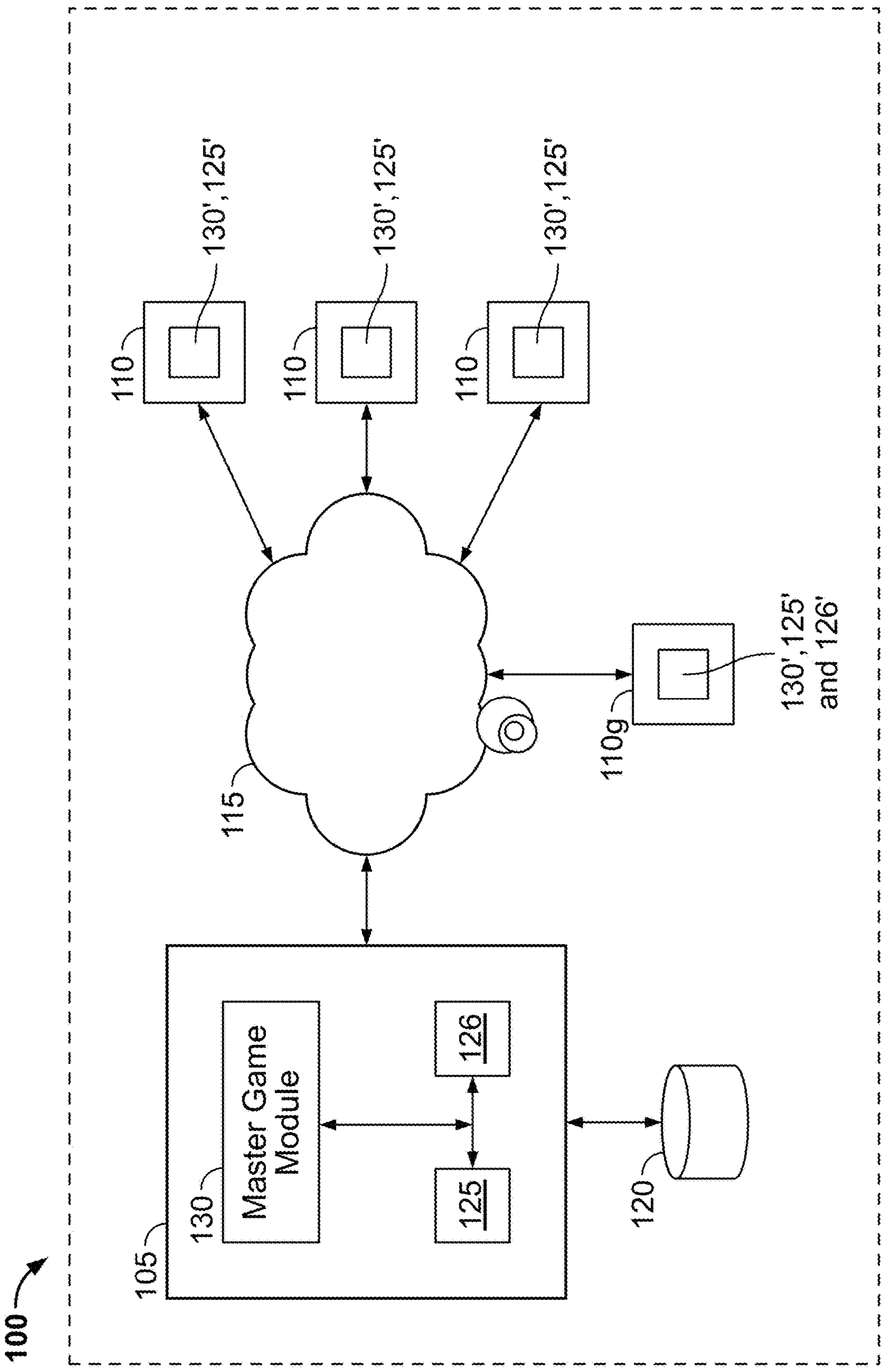
FIG. 1 illustrates an embodiment of a multi-player online gaming or massively multiplayer online gaming system in which the systems and methods of generating a graph structure may be implemented or executed, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming" or "massively multiplayer online gaming" environment may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module" or "engine" used in this disclosure may refer to computer logic utilized to provide a desired functionality, service or operation by programming or controlling a general-purpose processor. Stated differently, in some embodiments, a module, application or engine implements a plurality of instructions or programmatic code to cause a general-purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "runtime" used in this disclosure refers to one or more programmatic instructions or code that may be implemented or executed during gameplay (that is, while one or more game servers are rendering a game for playing).

The term "force invested or spent" as used in this disclosure refers to energy investment required to achieve any pose that has offset from a previous one in a dynamic sequence. Such energy investment comes from outside forces such as gravity, inertia, normal/frictional/tension forces, air resistance, buoyancy, and physical forces resulting from muscles exerting pull or push, and other such movements.

The term "Root" used in this disclosure refers to the highest joint/bone in a hierarchy of virtual character skeleton. Root is often used as an approximation of character location and orientation to run calculations such as, for example, replacing a character with a capsule to check if the width allows passing around obstacles.

The terms "master pose", "dominant pose" and "principal dominant pose (PDP)" are used interchangeably throughout this disclosure.

The terms "master node", "master pose node" and "master pose group" are used interchangeably throughout this disclosure.

The term "graph structure" used in this disclosure refers to a hybrid between state machines and motion matching, that utilizes high-dimensional data processing for creating dynamic, realistic, and responsive animated character behaviors.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a" "an" and "the" include plural references unless the context dictates otherwise. Although any systems and methods similar or equivalent to those described herein can be used in the practice or testing of embodiments of the present disclosure, the preferred, systems and methods are now described.

Overview

FIG. 1 illustrates an embodiment of a multi-player online gaming or massively multiplayer online gaming system/environment 100 in which the systems and methods of generating a graph structure (configured to enable controlled character motion synthesis) may be implemented or executed, in accordance with some embodiments of the present specification. The system 100 comprises client-server architecture, where one or more game servers 105 are in communication with one or more client devices 110 over a network 115. Players and non-players, such as computer graphics and animation personnel, may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

In some embodiments, the one or more game servers 105 may be implemented by a cloud of computing platforms operating together as game servers 105.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120.

In some embodiments, the database system 120 stores a plurality of game data including a corpus of motion capture ("mocap") data (associated with at least one game that is served or provided to the client devices 110 over the network 115) indicative of a plurality of animation clips where each of the plurality of animation clips is representative of a sequence of poses over time and includes a plurality of frames. Alternatively, or additionally, the database system 120 may include hand-authored or procedurally generated data containing fluid realistic motion. Thus, while the term "mocap data" is used hereinafter to describe various systems and methods of the present specification, it should not be construed as limiting since the systems and methods of the present specification are equally applicable to human-generated animations.

In various embodiments, each principal dynamic pose (PDP) of the mocap data has, associated therewith, pre-calculated metadata such as, but not limited to, a) velocity data indicative of an average displacement of body parts over a past frame using point cloud, b) acceleration data, c) force invested or spent (average force acting on each unit of body; actual location compared to predicted one based on previous location, velocity, gravity), d) location and orientation of center of mass (COM) of a body pose, c) location and orientation of Root, f) any tags for events (single frame) or states (duration), including "deprecated" tags which exclude portions of data from calculation, and any tags game logic may query, g) current transforms and velocities, h) index of PDP, i) address of PDP—that is, file and frame, j) list of similarity costs to all other PDPs, k) reference/pointer to closest similar PDP with respective cost, l) original predecessor and successor PDP, m) number of possible predecessors and successors in current data with cost <=1.0, as well as offsets to each in space and time, n) any user defined tag (such as, for example, "sneeze", etc.), o) any information related to collision object transform relative to Root, p) any information related to body parts colliding, and q) any information on context outside that derived from anatomical pose, such as, but not limited to amplitude of speech. It should be noted that the listing of pre-calculated metadata is provided by way of example only and not meant to be exhaustive. Other metadata may be included in the list so as to achieve the objectives of the present specification.

In accordance with aspects of the present specification, the one or more game servers 105 provide or implement a plurality of modules or engines such as, but not limited to, a motion synthesis module 125, a secondary animation (SA) module 126, and a master game module 130. In some embodiments, the one or more client devices 110 are configured to implement or execute one or more client-side modules at least some of which are same as or similar to the modules of the one or more game servers 105. For example, in some embodiments each of the player client devices 110 executes a client-side game module 130' that integrates a client-side motion synthesis module 125'.

In some embodiments, the client-side motion synthesis module 125' is configured to use a predetermined or pre-generated graph structure, also available at the game server 105, on each of the client devices 110, by replicating the internal state and any control parameters (such as, for example, actions of other players, artificial intelligence (this refers to non-player characters that are controlled by "artificial intelligence" game code on the game server 105), context and/or or any server initiated non-deterministic event which comes with any degree of randomness in its timing or effect, such as, but not limited to a lightning strike, for example) that cannot be reconstructed from other data. In some embodiments, the internal state is sufficient to reconstruct an animation pose or frame and run updates for client-side prediction. In embodiments, the client-side motion synthesis module 125' is configured to synchronize its location (i.e., previous/next nodes) within the graph structure with the game server 105 and collect sufficient contextual information in the form of state and/or control parameters to allow prediction of subsequent transitions.

In various embodiments, the server-side motion synthesis module 125 and the client-side motion synthesis module 125' together function as a high-level control system that modifies an animation blend tree and requires its state to be replicated across the network 115 to maintain client/server synchronization. A graph structure update will operate on a current state of a generated graph structure, elapsed time and a set of control parameters and produce an updated graph structure state as its output. A primary input to the update will be the set of control parameters from game code each frame that describe the intended motion. These parameters are synchronized (by the server-side motion synthesis module 125 and the client-side motion synthesis module 125') between client and server to ensure that the graph structure update is as close to deterministic as possible. Example control parameters include: a) desired/predicted character trajectory in terms of root bone transformations at key times in the future, b) other desired bone transforms, for example: torso direction (required to support strafing where character faces one direction and moves in another), c) metadata describing motion, such as stance (prone, crouched, standing), mantling, jumping, hiding behind cover (metadata may be associated with specific times in the future) and d) scalar quantities to be matched, for example height of wall when mantling. Historical data such as the past trajectory may also be included as control parameters.

In some embodiments, the graph structure update process takes the form of a search through the graph structure, starting from the current state, in order to find the lowest cost path that satisfies the constraints represented by the control parameters. Given the expected high connectivity of the graph structure, the search is optimized by skipping transitions that exceed the lowest cost found so far. The search involves building multiple future trajectories based on a root motion encoded in each graph structure transition and comparing these to the desired trajectory provided by the master game module 130 (i.e., the game code). In various embodiments, the depth of the search depends on how far in the future the desired trajectory extends and the root movement speeds present in the graph structure animation data. In embodiments, the search also incorporates calculation of costs for the control parameters (including, desired bone transforms, metadata, scalar quantities, and other such metrics). In some embodiments, the trajectory cost and the costs calculated for each control parameter are combined using a weighted sum to yield a single overall cost value.

Graph structure animation data might include animation segments or PDPs (those segments or poses that have some amount of velocity or movement). This is only a subset of the full motion capture or handmade sequences. At the same time, in some embodiments, the complete incoming sequences may be stored in the engine and reduce the content on demand on build.

In some embodiments, at least one non-player client device 110*g* executes the client-side game module 130' that integrates a client-side motion synthesis module 125' and a graph structure game development tool (GDT) module 126'. In various embodiments, the GDT module 126' is configured to generate one or more graphical user interfaces (GUIs) to enable the computer graphics and animation personnel to program at least the server-side motion synthesis module 125 and the client-side motion synthesis module 125' (collectively referred to, hereinafter, as the "motion synthesis module 125").

Motion Synthesis Module 125

In various embodiments, the motion synthesis module 125 implements a plurality of instructions of programmatic code to generate or construct an offline graph structure (also referred to as 'hyperpose graph' or 'hyperpose') having a plurality of master nodes and edges, such that each node is representative of a set of similar dominant poses (instead of animation clips) and edges are representative of plausible transitions between all dominant poses (although, a vast majority of such edges are deprecated due to quality and footprint/search considerations). It should be appreciated that combining similar poses into a single node helps reduce complexity of the graph structure by taking advantage of redundancy present in the source mocap data. It should further be appreciated that such an offline graph structure comprises a data structure stored in a non-transient computer memory.

In embodiments, the motion synthesis module 125 is further configured to generate motion at runtime by navigating through the graph structure and applying dominant poses from the plurality of master nodes of the graph structure. Since, a video game describes a desired motion using a plurality of control parameters (such as, for example, predicted root trajectory), therefore, transitions that match the plurality of control parameters most closely are selected (from the graph structure). In embodiments, the motion synthesis module 125 is configured to search ahead in the graph structure to synthesize motion paths that may not exist in the source mocap data. It should be understood that "searching ahead" is in the context of taking a current state and reading a list of possible "child" or "target" PDPs. This list can then be analyzed and rated based on feasibility of each node in regard to achievement of a desired goal (such as, for example, "getting closer to a target PDP", "leading to a desired tag", or any other such goal).

Frame of Reference (Root)

It should be appreciated that the systems and methods of the present specification are based on the concept of a graph structure that is directed towards increasing the dimensionality of source mocap data or content and saturating the result with 'N' samples. Stated differently, any source mocap data is represented as one 4D (four dimensional) object, also referred to as a graph structure, which is a pose with an extra dimension of 'time'. Thus, the graph structure can be illustrated as all possible states (poses) over-imposed on top of each other. This representation would be a 3D projection of a 4D object. Such a graph structure can be subsequently compressed as a set of samples describing the whole source mocap data, and the source motion can be reconstructed based on the samples and their native connections in the source mocap data. Consequently, any adjustment, modulation or updates to such samples invariably propagates into the adjustment of the whole mocap data, allowing adaptation, stylization, secondary asset stylization and the line.

The samples have natural "predecessors" and "successors." Some samples occupy the same space and thus are considered similar, sharing connections to form a network, resulting in a graph structure that can be navigated based on conditions. Such conditions are represented by the intersection of two sets or lists: a) a first list of requirements that the game design or AI (artificial intelligence) may request to be fulfilled (distance traveled, speed, orientation, specific data tag, or any other request) and b) a second list of requirements stored per PDP. Persons of ordinary skill in the art would appreciate that if light is shined on a 3D object, different 2D projections (shadows) are produced based on the angle at which the light is shined. Similarly, in the case of graph structure mechanics, by shining a light on a 4D object from different coordinate frames, different 3D shadows are generated. While all shadows are contained in a higher dimension object, only one is actualized at a time.

It should be appreciated that the collapse of 3D poses over time into one 4D pose is only meaningful if a deterministic Root is generated per item. There are several approaches known to persons of ordinary skill in the art such as, for example, joints, topology, collision primitive set, and voxelization (point cloud). While joints and topology seem to be readily available, their distribution is predicated on local desired fidelity and curvature and thus favors body parts based on parameters irrelevant to the comparison (i.e., fingers end up having more items than forcarms).

Objects, such as, for example, player-controlled characters, in a video game scene are typically modeled as three-dimensional meshes comprising geometric primitives such as, for example, triangles or other polygons whose coordinate points are connected by edges. In some embodiments, the motion synthesis module 125 implements a plurality of instructions of programmatic code to generate a tetrahedral lattice (THL) point cloud in the volume of character mesh, skin to core joints by using skin wrap of the character mesh for ultra-fidelity pass, and use sparse joints and a proxy volume mesh for quick passes. Stated differently, in some embodiments, the motion synthesis module 125 uses voxelization with tetrahedral point distribution instead of a square point distribution. However, alternate embodiments may use a square point distribution. In accordance with some embodiments, an optimum convergence of number of points versus quality of representation is achieved around 10 points per liter or 660 per average human body.

In some embodiments, the motion synthesis module 125 implements a plurality of instructions of programmatic code to further determine a plurality of THL measurements including THL locations, their inertia, and velocity. Based on the plurality of THL measurements a center of mass (COM), for a pose, is determined. Projection of a COM, downwards on the floor, is referred to as Root. Thus, all poses achieved in the source mocap data can be combined using THL defined Root as a frame of reference. For any pose the character achieves, similar poses get similar transforms. Having Root as the frame of reference enables snapping of the poses together by their best mathematically possible transform, which is not dependent on data size—that is, consistent and deterministic. Thus, if all transforms pertaining to each pose are given in space of Root, any two poses are compared in the shared space.

Graph Structure Construction

Figure 2:
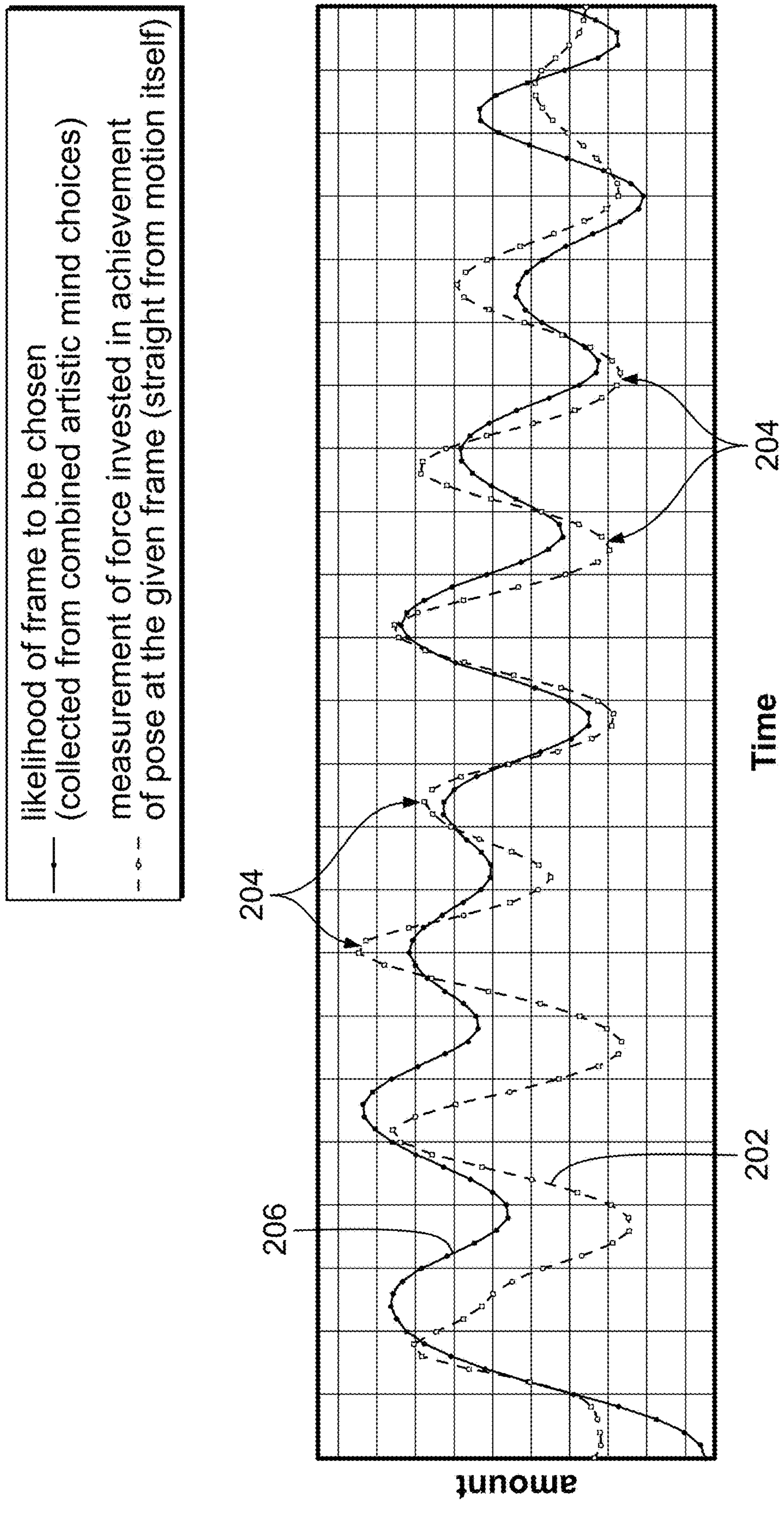
FIG. 2 illustrates a force curve calculated from sampling mocap data points, in accordance with some embodiments of the present specification.

Identifying dominant poses or frames: In embodiments, generation of the graph structure begins by automatically identifying or determining, from the corpus of source mocap data, a subset of dominant poses or frames (also referred to as 'principal dynamic poses' (PDPs)) that are intended to be artistically relevant or important (that is, poses or frames similar to those artists would choose). The set of dominant poses or frames are indicative of a minimal set which can be used to rebuild the whole source mocap data. To identify dominant poses or frames, the motion synthesis module 125 is configured to implement a method of motion segmentation that can be applied to whole motion sequences to identify the most artistic "cut" frames. The plurality of THL measurements enable determining velocity, acceleration and force invested or spent or work done at any given point in the mocap data. In some embodiments, the method of motion segmentation samples mocap data using the measurement of force invested or spent (i.e., work done). FIG. 2 shows a force curve 202 calculated from sampling mocap data points, in accordance with some embodiments of the present specification. The force curve 202 is indicative of a measurement of force invested in achievement of a pose at a given frame. A second curve 206 is indicative of a likelihood of frames to be chosen, as collected from combined artistic mind choices.

In some embodiments, the method of motion segmentation identifies poses or frames corresponding to the peaks and valleys values 204 (or the maximum and minimum values), of the force or work done curve 202, as special states, referred to as dominant poses, frames or PDPs. Effectively, the motion synthesis module 125 is configured to calculate data indicative of velocity, acceleration and energy invested in movement per frame. The calculated data, when plotted or otherwise analyzed, form a curve over time that resembles a phase function or sine wave. The curve is smoothed and frames corresponding to the peaks and valleys of the curve are referred to as the dominant poses, frames or PDPs. Thus, the method of motion segmentation identifies dominant poses, frames or PDPs that bear very close resemblance to the poses or frames picked by artists. For example, on average, it was found that various artists deviated +/−3 frames from each other when they selected the best poses or frames from a timeline, whereas the method of motion segmentation provides an average+/−1.25 frame deviation from average human choice.

It should be appreciated that once a set of dominant poses, frames or PDPs have been identified, for a motion sequence, all in-between poses or frames may be considered as derivatives of the set of dominant poses, frames or PDPs and hence can be reconstructed from the dominant set. Stated differently, the whole of the motion sequence is represented with its' small but most influential subset of poses or frames, namely the dominant poses, frames or PDPs. Thus, the source motion capture data can be derived from the set of dominant poses or frames by extrapolating a force curve across the set of dominant poses.

Figure 3:
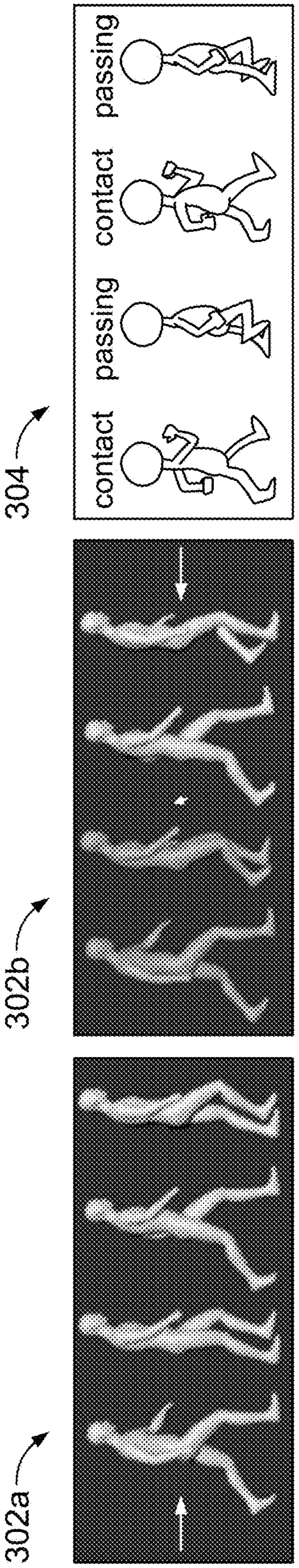
FIG. 3 illustrates first and second sets of dominant poses, frames or PDPs identified for walk forward and back, in accordance with some embodiments of the present specification.

As a non-limiting illustration, FIG. 3 shows a convergence set output of dominant poses, frames or PDPs 302*a*, 302*b* identified from a set of walk forward and walk backward, in accordance with some embodiments of the present specification. Effectively, the whole motion can be represented with a first set 302*a* of four poses for walking forward and a second set 302*b* of four poses for walking backward. The first and second sets 302*a*, 302*b* are identified automatically using the method of motion segmentation of the present specification. The identified first and second sets 302*a*, 302*b* map to the classic representation of a walk cycle and replicate pose segmentation or cuts 304 determined by an application of artistic mind to mocap data. The dominant poses, frames or PDPs of the present specification are artistic, deterministic, and character-agnostic.

Figure 7A:
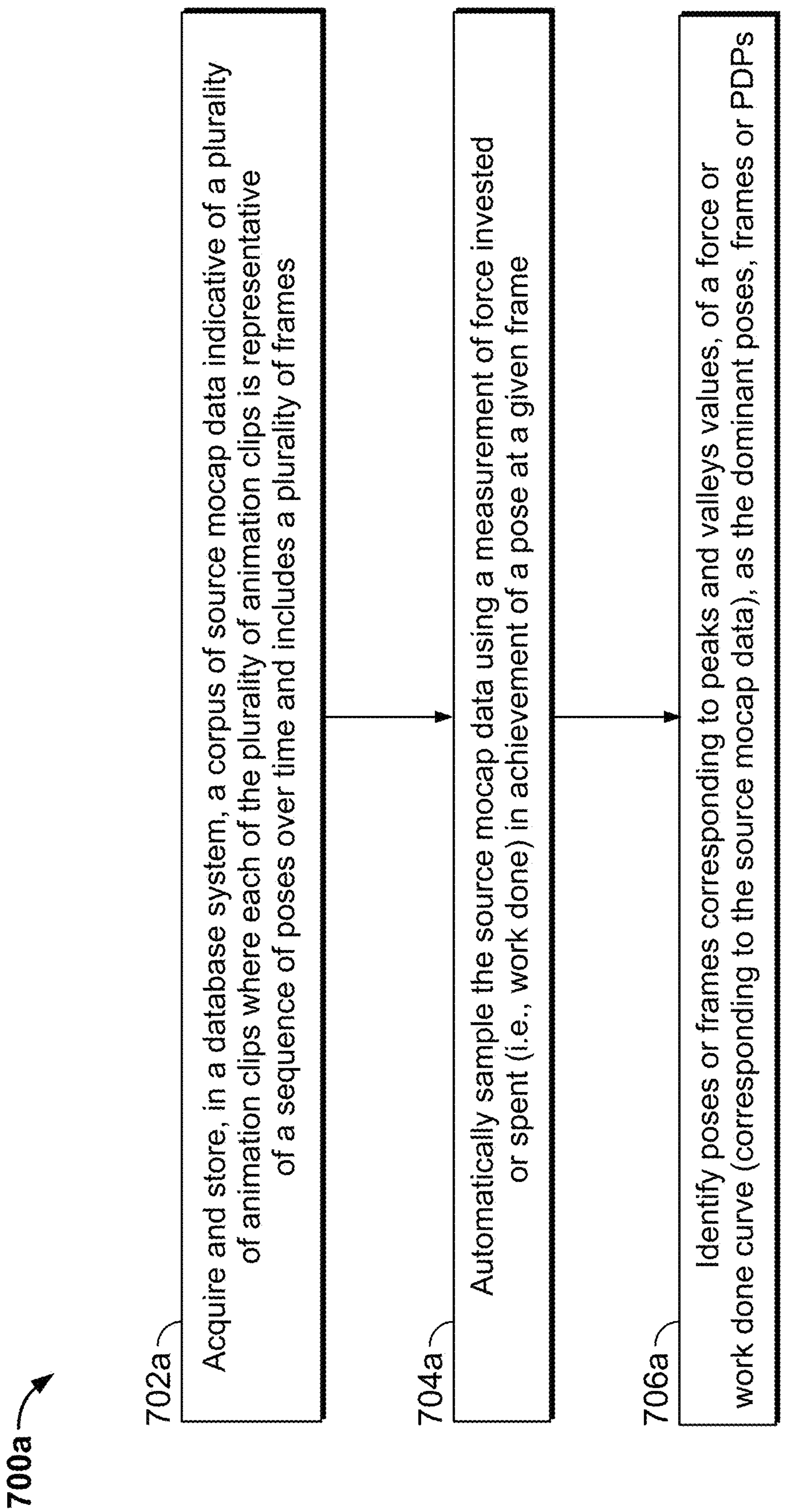
FIG. 7A is a flowchart of a plurality of exemplary steps of a method of identifying dominant poses, frames or PDPs, in accordance with some embodiments of the present specification.

FIG. 7A is a flowchart of a plurality of exemplary steps of a method 700*a* of identifying dominant poses, frames or PDPs, in accordance with some embodiments of the present specification. In various embodiments, the method 700*a* is implemented by the motion synthesis module 125.

Referring now to FIGS. 1 and 7A, at step 702*a*, acquire and store, in the database system 120, a corpus of source mocap data indicative of a plurality of animation clips where each of the plurality of animation clips is representative of a sequence of poses over time and includes a plurality of frames. Alternatively, or additionally, the database system 120 may store hand-authored or procedurally generated data containing fluid realistic motion.

At step 704*a*, the module 125 automatically samples the source mocap data using a measurement of force invested or spent (i.e., work done) in achievement of a pose at a given frame. In some embodiments, a plurality of THL measurements enable determining velocity, acceleration and force invested or spent or work done at any given point in the source mocap data.

At step 706*a*, the module 125 identifies poses or frames corresponding to peaks and valleys values, of a force or work done curve (corresponding to the source mocap data), as the dominant poses, frames or PDPs.

Comparing dominant poses or frames: each of the identified subset of dominant poses, frames or PDPs is then compared against each of the other dominant poses, frames or PDPs (that is, each PDP is compared against each other PDP) in the database using a comparison cost value calculated over a fixed time window centered at each pose or frame. The use of a time window is important as it means that pose similarity is not based solely on bone transforms at a particular instant in time, although the motion of the bones before and after the pose or frame is also considered. Thus, dominant pose comparison includes the dynamic part or velocity. In embodiments, dominant pose comparison compares not just two dominant poses but their time-related context as well. Dominant pose comparison is based on a potential of dynamic poses to achieve each other, as in the ability to blend from dominant pose 'A' to dominant pose 'B'.

If a body is represented with its volume, it is possible to identify the true center of mass (COM) for any pose the body achieves. Accordingly, an associated uniform center of mass (COM) and Root is calculated for each of the identified dominant poses, frames or PDPs. For the purpose of pose comparison, Root being consistent and deterministic is desired, since all comparison happens in space of Root. Thus, two identical poses with Roots being offset in either direction would not be considered identical since in space of Root, all joints are offset. Classical placement of Root joint was quite often done by hand and was not deterministic. For large data sets which disallow manual placement, the Root quite often was placed as projection of average ankle location, or projection of the hip joints, which may be inaccurate (consider a karate kick pose placed "between ankles" Root, which would be widely off center of mass, or crouched pose placing "hip projection" Root, which would be way behind the center of mass). The approach of the present specification with pre-calculated COM (center of mass) is desirable for pose comparison and subsequent processing.

Since the number of comparisons to run scales up geometrically, in some embodiments, a staged comparison is performed (of each of the identified dominant poses, frames or PDPs against the other dominant poses, frames or PDPs). In the first pass or stage, a comparison is performed of one single node of each of two candidate poses: COM (center of mass). It is possible for two different poses to have similar COM, but it is not possible for two similar poses to have different COMs. Thus, in the first pass or stage a large number of comparisons are eliminated which would have resulted in poor quality anyway, however, a number of false positives still remain. In the second pass or stage, a comparison is performed of the poses using several nodes (say, for example, joints for ankles, hands, pelvis, shoulders, and head). Similar to COM, some bad connections are eliminated from further calculations. On the third pass or stage, a plurality of joints such as, for example 32 joints, may be considered. On the final pass or stage, a comparison is performed point cloud mesh to point cloud mesh for top fidelity.

Thus, the comparison (of each of the identified dominant poses, frames or PDPs against the other dominant poses, frames or PDPs) is an N^2 process, so multiple passes with thresholding is required to manage memory and performance costs. The comparison (of each of the identified dominant poses, frames or PDPs against the other dominant poses, frames or PDPs) is initiated based on the COM, which eliminates the definitively bad connections and shrinks the problem space. For example, a COM of walk backwards has a negative Y-axis velocity, while a COM of walk forward has a positive Y-axis velocity. Thus, there is need to compare all the point cloud, or any extra joints, since there is no condition under which such vast difference can be diminished on a more detailed level.

Thereafter, the comparison is run over the results in iterations, increasing the pool of nodes compared with each step. The final comparison, being the most accurate one, is done on point cloud mesh. The proper multipliers of the interim passes are set such that no valid connections are lost due to interim filters and only the bad connections are skipped to save calculation time. In increasing the number of nodes in the comparison set with each successful pass or stage, a degree of error can be introduced in the early stages to avoid false negatives. These can be used as multipliers to the resulting cost, for example a 0.5 multiplier for COM comparison, 0.75 multiplier for second stage, and so forth. However, an exact multiplier to use (at each pass or stage) is dependent on the specific set of nodes used. Since dominant poses are compared with their immediate predecessors and successors (history and future) in mind, the comparison is performed in four dimensions.

It should be appreciated that to transition between two dynamic poses or PDPs A and B, an offset is introduced, but each motion already has some offset present (temporal, i.e., "motion"). In some embodiments, the offset required for the transition is compared to the offset present in both candidates (A and B) to calculate a comparison cost value. The comparison cost value, in some embodiments, is determined by dividing the distance between some node of pose A and the same node of pose B, by an average velocity of the two poses. Thereafter, an average or median result of all nodes combined is taken. Thus, since each PDP has velocity, it is compared with offsets required to achieve each other PDP (using Roots as a coordinate frame). The comparison cost value is equal to 0 for self-transition (since offset required equals 0) and to 1.0 in the case of motions where just enough temporal offset is present to match the required one. A cost value of 0 means perfect transition, and 1.0 means transition which seems borderline "good" given the motions. Stated differently, the motion synthesis module 125 compares offsets to counteract (distance to cover due to pose difference) and offsets to current velocity (capacity to cover distance), with both as vectors-direction of offset and direction of movement, respectively. Thus, fast moving poses will have an easier time blending (covering distance) to other poses. When the capacity to cover distance is equal to the distance to cover, the cost is 1.0. When the distance to cover is 0 (poses are identical), the cost is 0. The lower the cost, the better. In some embodiments, motion vector differences are also factored, so two completely position-wise matching poses having opposite velocity vectors will not yield a cost of 0 but will factor in the inertia.

In some embodiments, cost values associated with each transition from a dominant pose to every other dominant pose (in the identified subset of artistically relevant dominant poses, frames or PDPs) are calculated and stored in the database system 120. The stored cost values include those ranging from 0 to 1.0 as well as those above 1.0. Cost values over 1.0 are possible and also stored in order to parse them if no good transition is available for other reasons, which allows finding the 'next best possible' connection where the 'best' is not available.

In embodiments, a maximum comparison cost value can be manipulated or customized to determine a desired number of PDPs. This enables determining optimal PDPs to represent 'N' megabytes, and the process does not affect the number of motions but their reconstructed fidelity. This scalability is immensely effective for LODs and allows parity with mobile without dropping any mechanics.

Figure 7B:
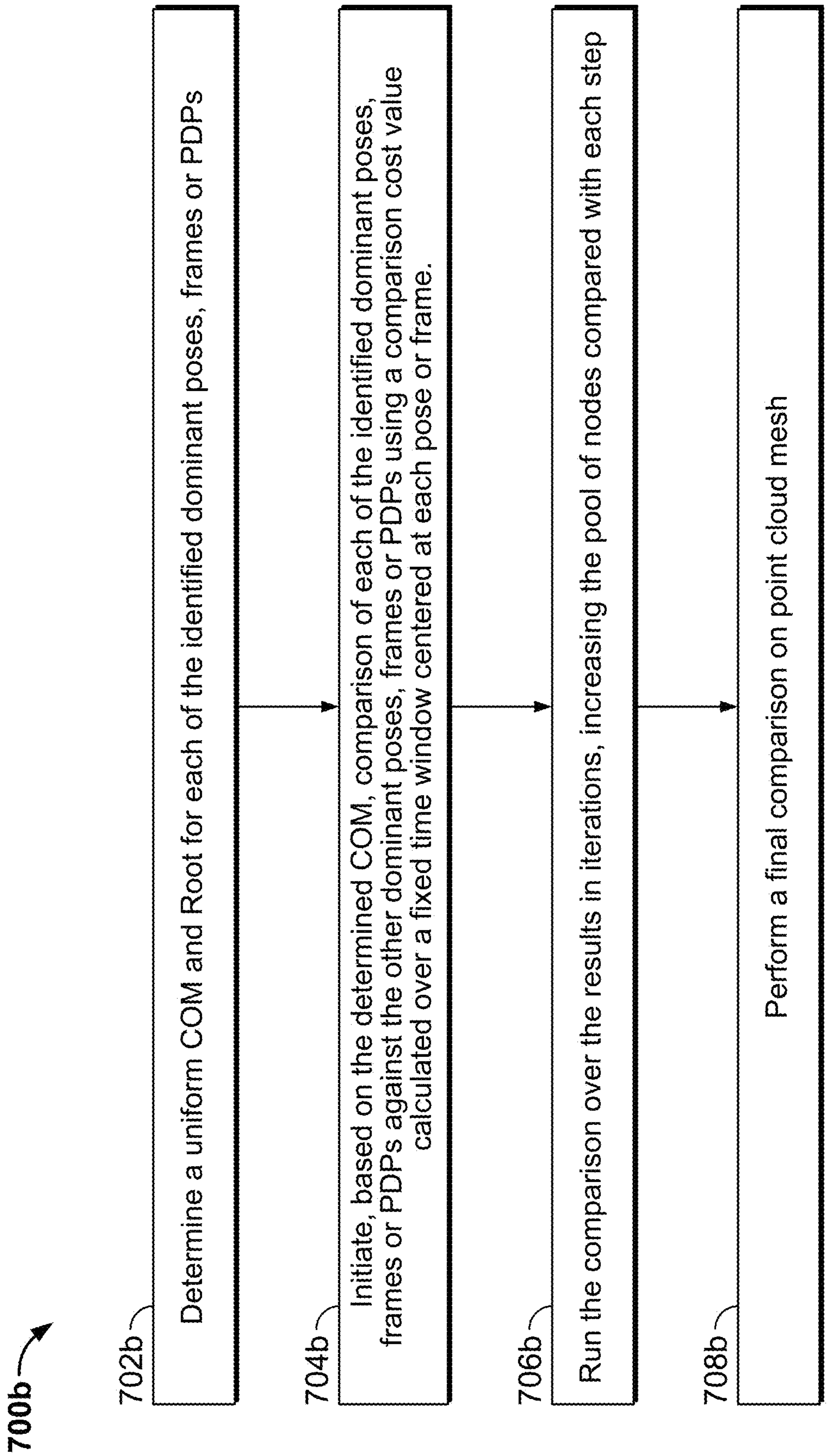
FIG. 7B is a flowchart of a plurality of exemplary steps of a method of comparing the identified dominant poses, frames of PDPs, in accordance with some embodiments of the present specification.

FIG. 7B is a flowchart of a plurality of exemplary steps of a method 700*b* of comparing the identified dominant poses, frames of PDPs, in accordance with some embodiments of the present specification. In various embodiments, the method 700*b* is implemented by the motion synthesis module 125, which is configured accordingly.

At step 702*b*, the module 125 determines a uniform COM and Root for each of the identified dominant poses, frames or PDPs.

At step 704*b*, the module 125 initiates, based on the determined COM, a comparison of each of the identified dominant poses, frames or PDPs against the other dominant poses, frames or PDPs in the database using a comparison cost value calculated over a fixed time window centered at each pose or frame.

At step 706*b*, the module 125 runs the comparison over the results in iterations, increasing the pool of nodes compared with each step.

At step 708*b*, the module 125 performs a final comparison on point cloud mesh.

In embodiments, dominant poses are grouped to form one or more master pose nodes. Based on a comparison of the dominant poses, frames or PDPs, it is observed that many of them have negligible comparison cost values and can therefore be grouped into master pose nodes. That is, the dominant poses can be grouped based on their transition or comparison cost values. In embodiments, it should be noted that cost values may have a wide range, which allows the user to introduce a threshold for grouping similar PDPs into master pose nodes. As a general rule, the higher the threshold, the more poses that are grouped together with a lower extent of similarity, and a smaller number of nodes to work with, and therefore a smaller footprint. A lower threshold allows for more blend quality precision at the cost of working with a larger set of nodes. In allowing for a tunable threshold, the present invention affords greater scalability options while allowing for the same data to be built for both low end and high-end platform specifications.

It should be appreciated that very low-cost values indicate that the poses are effectively identical, and thus, the utility of including them in the final data set is low. In contrast, unique poses have no "under 1.0" similarities; such poses contribute a substantial amount of "character" and uniqueness into the set, and thus might be more useful to keep. There might also be glitches in the data, such as singular flipping of both knees to bend backward. This approach helps identify such outliers and enables awareness to disapprove of or deprecate them.

Dominant poses with similar motion over the time window (as defined by a time threshold that, in some embodiments, is 7 frames in the past, 7 frames in the future, with 30 FPS—that is, analyzing half a second in total. This is implied by average spacing of PDPs by 7.5 frames. In some embodiments, it is possible to use case-specific time thresholds, based on actual time distance to previous and next PDP on case-by-case basis) are grouped together to form a "master pose" node in the graph structure. For example, dominant poses related to walk forward and back animation sequence may be grouped into a corresponding master pose node. Thus, the graph structure encapsulates all PDPs and metadata of each PDP related to its possible predecessor, successor, and similar PDPs.

In embodiments, transitions from each master pose node are determined by the successors of its constituent PDPs. Say there are PDPs A and B and that there are also PDPs X and Y. It may be known that in the source data A leads to B and X leads to Y. It is known that the connection cost of A→B is 0 by querying possible parents of B and checking their costs to A. Since possible parents of B include A itself, such cost is then 0. If there is a case where A is similar to X with a cost of 0.2, this now means A can lead to Y with cost of 0.2, or X can lead to B with the cost of 0.2. Thus, transitions from each PDP can be forward or backward in time. They are determined by PDPs similar to a current PDP, PDPs similar to natural predecessor of the current PDP, and PDPs similar to natural successor of the current PDP.

To improve connectivity and responsiveness of the graph structure, less desirable transitions may also be added from dominant poses that fall outside of the master pose comparison cost value. In addition to the target pose, each transition may contain associated metadata such as, but not limited to, Root motion (that is, offset of Root transform over time), tags or precisely timed event data such as metadata, and float curves defining volume of speech per frame, or other associated metadata.

It should be appreciated that the process of grouping of dominant poses can be harnessed to produce smaller datasets for resource constrained platforms, such as mobile applications. Larger master pose groups or nodes can be achieved by increasing the similarity threshold, yielding a fewer number of master poses and therefore a smaller graph. In some embodiments, given that dominant poses within a master node are interchangeable to some degree, less important dominant poses can also be dropped to trade quality for reduced memory usage. Furthermore, in some embodiments, grouping could be applied dynamically at runtime as a means of optimizing the graph structure search.

Stated differently, since the dominant poses are grouped based on their transition or comparison cost values, a modulation of a predefined, yet customizable, cost threshold or cutoff affects the number of master poses. The lower the cost threshold, the higher the number of master poses in a graph structure. The higher the cost threshold, the fewer the number of master poses in a graph structure. As discussed earlier, to compare PDP ‘A’ to PDP ‘B’, a set of nodes (that can be joints or a point cloud skinned to joints) are used. The average location of the set of nodes per frame is center of mass. A projection of the center of mass downwards is referred to as the ‘Root’ joint transform. In order to compare PDP ‘A’ to PDP ‘B’, a velocity of each point of the point cloud is measured in the coordinate frame of their respective “root” joints, over time. Over the same time period, a distance between respective points of A and B is also measured (the “distance to cover”). This distance to cover (for interpolation) is divided by the velocity to determine the comparison cost value. It should be appreciated that other functions may be used to determine the comparison cost value using distance to cover data and/or velocity data. In some embodiments, it is assumed that the comparison cost value of 0 is “self” (no distance to cover) and the comparison cost value of 1.0 is “maximum plausible cost” (since there is just enough motion to compensate for offset required to interpolate).

It should be appreciated that in a software application configured to allow an animator to define cost values that govern the grouping of dominant poses, in one embodiment, a graphical user interface is generated and configured to receive a cost value that drives the number of master poses in a graph structure. In accordance with some embodiments, any value can be used as a cost threshold. Thus, in some embodiments, if a comparison of PDPs ‘A’ and ‘B’ meets a user defined cost threshold, the two PDPs are considered “successfully similar” or “sufficiently similar” for a transition to be allowed. Also, in some embodiments, if a comparison of PDPs ‘A’ and ‘B’ meets the user defined cost threshold, then the PDPs qualify to be part of (or constitute) a convergence set (described with reference to FIGS. 4A and 4B), —that is, the PDPs are “successfully similar” or “sufficiently similar” to constitute a convergence set. Thus, two PDPs being “successfully similar” or “sufficiently similar” mean that the two PDPs meet a user defined cost threshold.

Figure 4A:
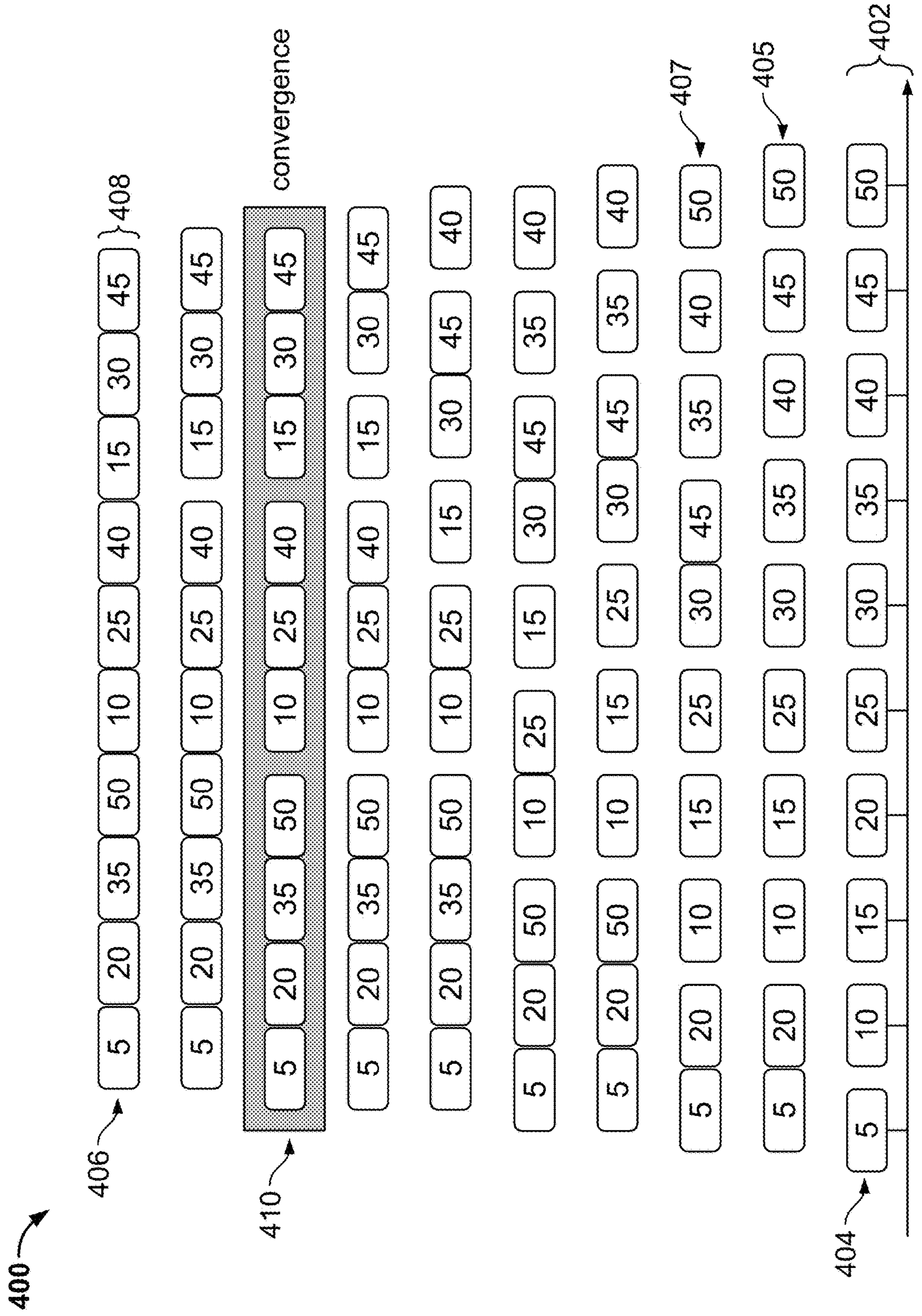
FIG. 4A illustrates a set of dominant poses conceptually represented as a pyramid, in accordance with some embodiments of the present specification.

In one embodiment, multiple cost values may be used to define the dominant and master layers. For example, as shown in FIG. 4A, the set of dominant poses 402 may be grouped or collapsed step-by-step to conceptually represent an HRM (hierarchical reduction matrix) or pyramid structure 400, with cost threshold increasing as one goes up the pyramid 400. In embodiments, by storing only the dominant poses or PDPs and performing pre-calculation of this type allows for quick sliding up or down the pyramid 400, and can be mapped to footprint or cycles required. That is, based on the megabytes of footprint available, a state machine can be generated which contains entities of total cost at or below target. This is effective since the high level routes the state machine takes are effectively the same; thus, state machines for high end platforms will contain several times more versatility but effectively arrive to target by very similar sequences to those of mobile builds of much fewer nodes.

The lowest level 404 of the pyramid 400 is comprised of the source dominant poses or PDPs 402 that are all compared and have costs each to each ranging from 0 to infinity. In the first pass, the most similar of the dominant poses or PDPs are chosen to be grouped together in order to generate the next higher level 405. Thereafter, in the subsequent pass, the next most similar of the dominant poses or PDPs are grouped to generate the next higher level 407. This process of grouping similar dominant poses or PDPs is repeated to generate multiple layers of the pyramid 400 to arrive at a convergence level or set 410 having a minimum set of master poses that have maximum effect (that is, a maximum capacity to achieve a goals set for a game character by game logic, and the best quality possible).

As shown, the lowest level 404 of the pyramid 400 is completely flat, with each dominant pose 402 being its own master, and the top level 406 being a full collapse of whole set of dominant poses 402 into a single master pose 408. Thus, the lowest level of the pyramid 400 contains all dominant poses or PDPs 402 and while traversing up the pyramid 400 one PDP is replaced for each level with a pointer until a single PDP and its mirrored counterpart. In embodiments, the number of levels in the pyramid 400 is equal to number of original dominant poses 402. It should be appreciated that, in one embodiment, the present invention is directed to a non-transitory computer readable memory comprising this data structure.

Figure 4B:
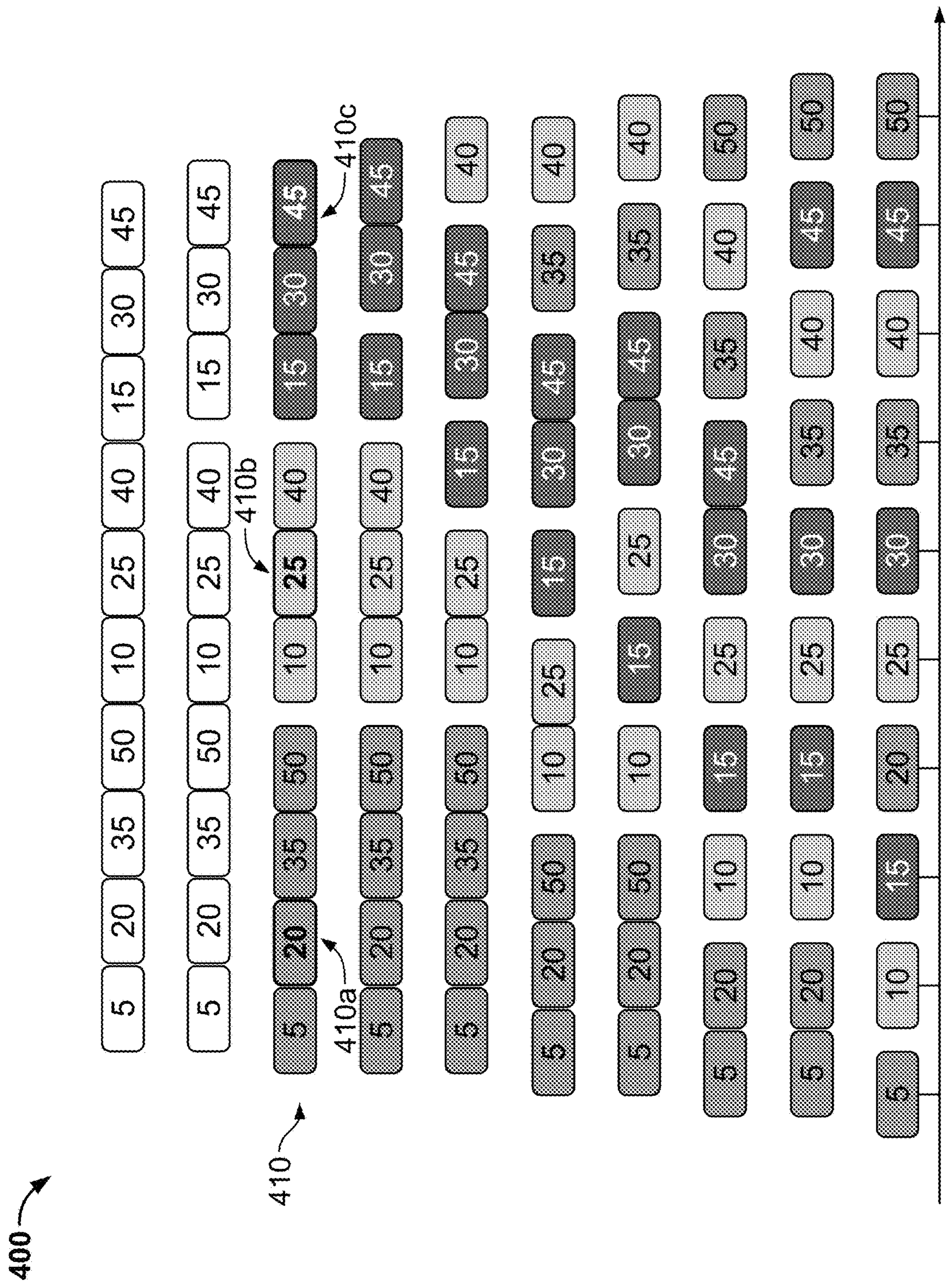
FIG. 4B illustrates another representation of the pyramid of FIG. 4A based on color-coding a convergence level, in accordance with some embodiments of the present specification.

As shown in FIG. 4B, for case of further analyses and understanding, the first master pose 410*a*, the second master pose 410*b* and the third master pose 410*c*, of the convergence level or set 410, are now represented using first, second and third colors, respectively. In each master pose 410*a*, 410*b*, 410*c* either the most influential dominant pose can be chosen or a weighted average of the component dominant poses may be generated. In embodiments, the most influential pose can be chosen by measuring its cost over all non-deprecated PDPs. Stated differently, the effect is (1-cost), clamped between 0 and 1. Thus, one gets effect of each PDP over all other PDPs, which can be accumulated or even weighted (having effect of 1.0 over two independent yet identical PDPs should not give 2.0 but 1.0 since those are clamped as identical). As an illustrative example, the former approach is taken (i.e., the most influential dominant pose is chosen) thereby collapsing the timeline to three master poses or PDPs: 20, 25 and 45, as these are the ones that got clumped together with siblings on the lowest levels of the pyramid 400.

Figure 4C:
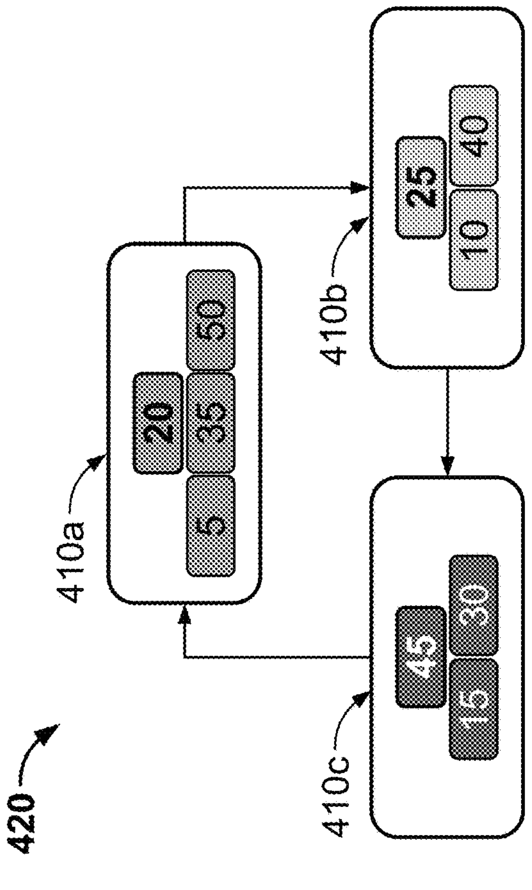
FIG. 4C illustrates a generalized graph space using dominant poses, frames or PDPs of the convergence level, in accordance with some embodiments of the present specification.
Figure 4D:
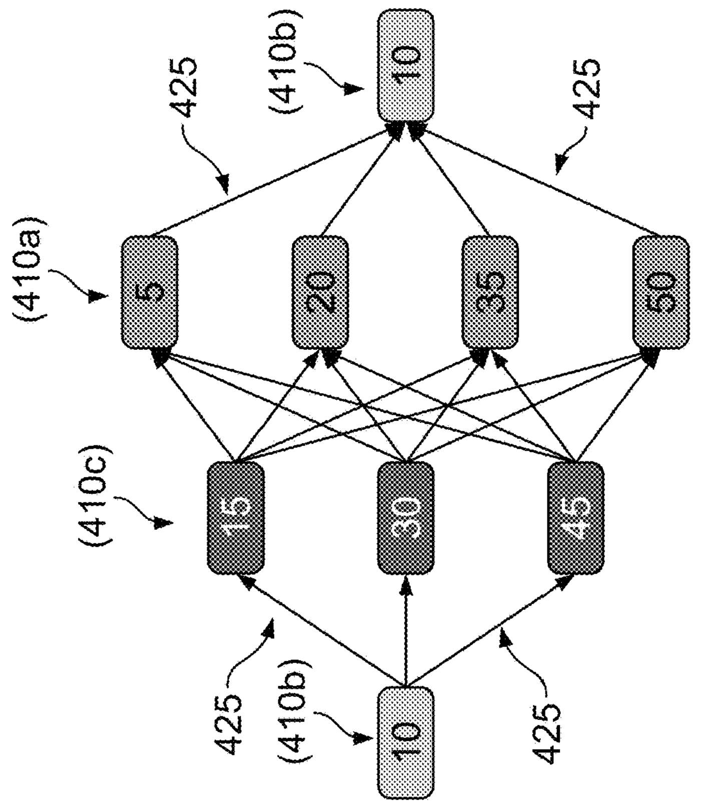
FIG. 4D illustrates a plurality of graph paths generated by leveraging the generalized graph space of FIG. 4C, in accordance with some embodiments of the present specification.

Knowing the predecessor and successor dominant poses for each of the three most influential dominant poses 20, 25 and 45, a generalized graph space 420, of FIG. 4C, may be generated. It should be noted that the component dominant poses, in the same master pose, share good quality connections with the same predecessor and successor dominant poses, since that is the necessary condition for them to be grouped in the first place. While the individual dominant poses 402 (FIG. 4A) may still be stored for increased variety, the graph 420 provides an identical solution whether they are used or not, meaning there is predictable and consistent behavior on all level of details (LOD). Leveraging the generalized graph space 420, FIG. 4D shows that a plurality of graph paths 425 can be generated from any master pose node (first master pose 410*a*, the second master pose 410*b* or the third master pose 410*c*) to any other master pose node. For example, as illustrated in FIG. 4D, graph paths 425 are shown beginning from the dominant pose 10 in the master pose node 410*b*, then to the dominant poses 15, 30 and 45 in the master pose or node 410*c*, then to the dominant poses 5, 20, 35, 50 in the master pose node 410*a* to loop back to the dominant pose 10 in the master pose node 410*b*. Thus, the generalized graph space 420 can be resolved on high level or low level, with similar results.

Referring back to FIG. 4C, in some embodiments, a search for paths in the graph space 420 may be conducted in multiple passes. For example, a first pass would consider 25→45→20→25. A second pass may compare possible paths by their minute differences and find the best possible route. The first, second and third master pose nodes 410*a*, 410*b*, 410*c*, respectively, are essentially identical nodes since all are of the same duration and are devoid of identity and meaning. Therefore, it could be just collapsed to a 20→25→45 loop. There may be cases of poses which are extremely similar, and may introduce a threshold of meaningful difference. A first approach is to assign an arbitrary number, such as "collapse everything with similarity cost of <=0.1", while a second approach is to choose such collapse based on desired number of megabytes of the footprint.

As another example, suppose one starts in PDP 15 and wants to achieve PDP 40. If the resource is plentiful, natural connections of both can be evaluated to find that 15 leads to 20, and 35 leads to 40, and 20 and 35 have a cost of 0.1. So, the route is 15-20-40, or 15-15-35-40. But that would entail checking 4 successors of 15, 4 predecessors of 40, and comparing those 4 and 4. Alternatively, one can query successors of 45 (to which 15 points) and predecessors of 25 (to which 40 points). In this realm, only two queries are performed to get 45-20-25, subsequently replacing 45 with 15 and 25 with 40, meaning 15-20-40. Thus, one ends up with the same result as before, but at much higher speed.

Thus, the graph space 420 (of FIG. 4C) is indicative of a high-level planning using few dominant poses, frames or PDPs of the convergence level or set 410 (FIG. 4A) that can be easily unpacked, as shown in FIG. 4D, to multiple unique components for highest fidelity.

Figure 7C:
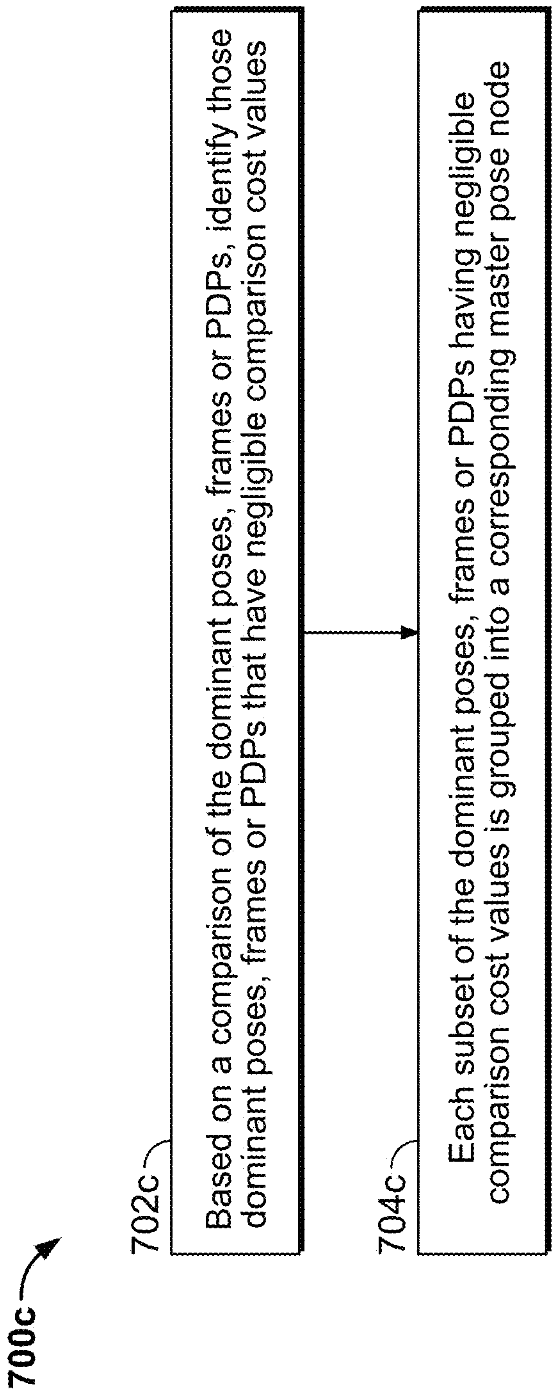
FIG. 7C is a flowchart of a plurality of exemplary steps of a method of grouping the identified dominant poses, frames of PDPs to form one or more master poses, in accordance with some embodiments of the present specification.

FIG. 7C is a flowchart of a plurality of exemplary steps of a method 700*c* of grouping the identified dominant poses, frames of PDPs to form one or more master poses, in accordance with some embodiments of the present specification. In various embodiments, the method 700*c* is implemented by the motion synthesis module 125.

At step 702*c*, based on the comparison of the dominant poses, frames or PDPs, the module 125 identifies those dominant poses, frames or PDPs that have negligible comparison cost values. The comparison cost values associated with each transition from a dominant pose to every other dominant pose are pre-calculated and stored in the database system 120.

At step 704*c*, each subset of the dominant poses, frames or PDPs having negligible comparison cost values is grouped into a corresponding master pose node. That is, the dominant poses are grouped into one or more master pose-nodes based on their transition cost values.

Touch corner use-case: An illustrative, non-limiting, example is of 3200 frames (having an overall duration of just under 2 minutes) of source mocap data. The source mocap data is indicative of walking and turning, but most importantly contact with world object, such as wall corner.

Figure 5A:
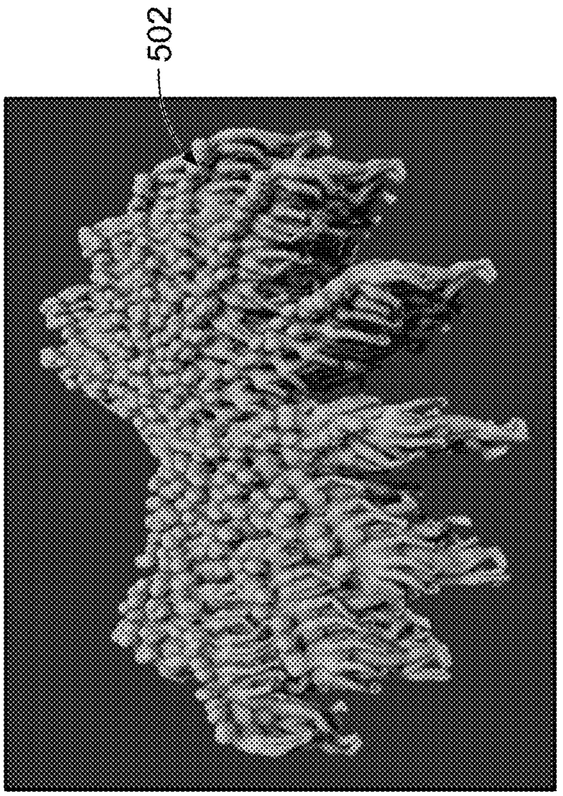
FIG. 5A illustrates a plurality of dominant poses, frames or PDPs identified from exemplary mocap data, in accordance with some embodiments of the present specification.

Application of the method of motion segmentation, to the source mocap data, produced 485 dominant poses, frames or PDPs 502, shown in FIG. 5A, with an average duration of 6.6 frames between them. The first 120 and the last 80 frames were deprecated due to T-pose, which could be done manually or automatically. Consequently, the dominant poses, frames or PDPs account for 15.15% of the source mocap data. As known to persons of ordinary skill in the art, in motion capture, takes usually start and end in the actor roughly achieving T-pose (stand straight with arms stretched sideways). This helps spread out the markers. However, the utility of this pose is only relevant for mocap analysis and not for game actions.

Figure 5B:
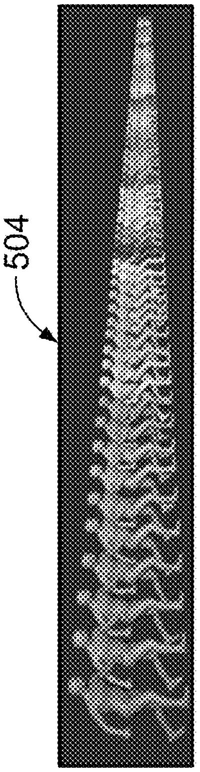
FIG. 5B illustrates closely matching dominant poses for an exemplary dominant pose, in accordance with some embodiments of the present specification.
Figure 5C:
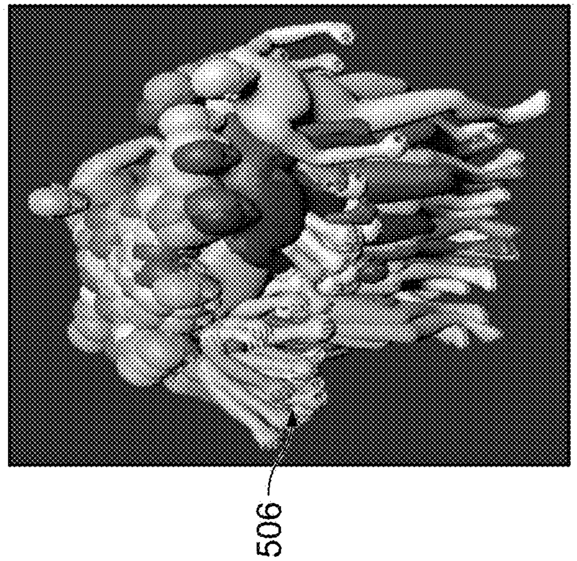
FIG. 5C illustrates direct and natural successors of the closely matching dominant poses of FIG. 5B, in accordance with some embodiments of the present specification.
Figure 5D:
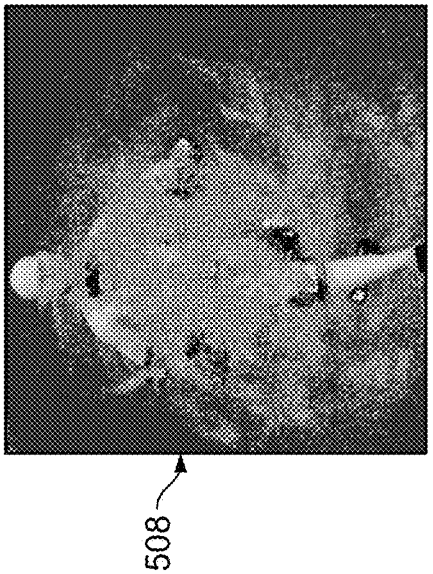
FIG. 5D illustrates a field 508 of possible pasts and futures, in accordance with some embodiments of the present specification.

FIG. 5B shows a dominant pose at frame 2390 and its 118 closest matches 504 (i.e., the matches with cost <=1.0). Stated differently, FIG. 5B shows PDPs found in the data set but sorted by increasing cost to PDP at frame 2390 (the cost increasing from left to right with the rightmost ones closer to cost of 1.0). Consequently, FIG. 5C shows the direct and natural successors 506, of the 118 matches 504 that are available from the dominant pose at frame 2390. Referring now to FIG. 5D, if, all possible predecessors (Ins) and successors (Outs) of a pose are represented as point cloud using just one minute of mocap data, the result is a field 508 of possible pasts and futures, rated by their likeliness. This shows a portion of "complete" graph structure achievable from the current sample (any PDP is basically a sample of the "complete" graph structure). At this stage, visuals become quite complicated because projection is not just being done in space, but also in time.

Figure 5F:
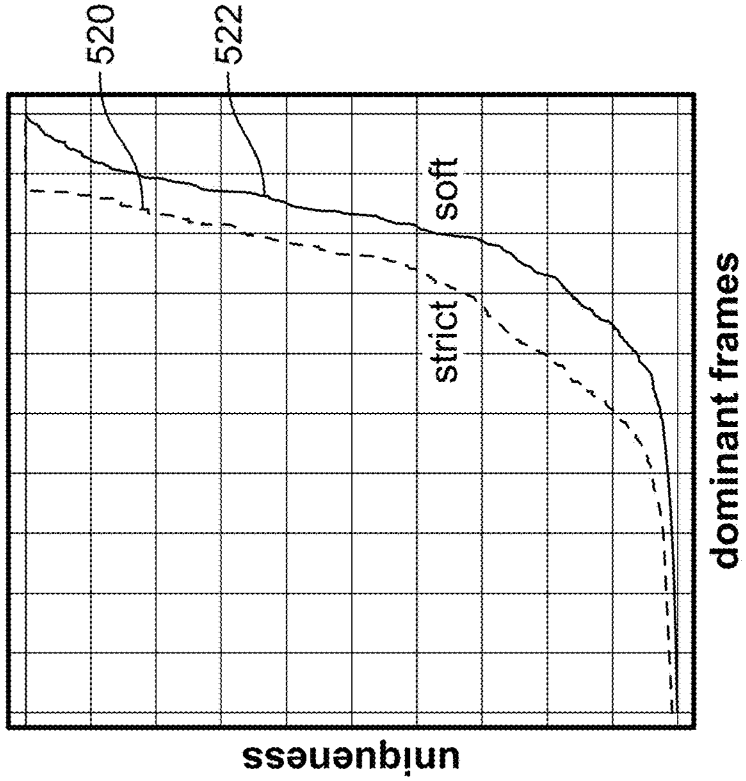
FIG. 5F illustrates the uniqueness of each dominant pose over the source mocap data, in accordance with some embodiments of the present specification.
Figure 5E:
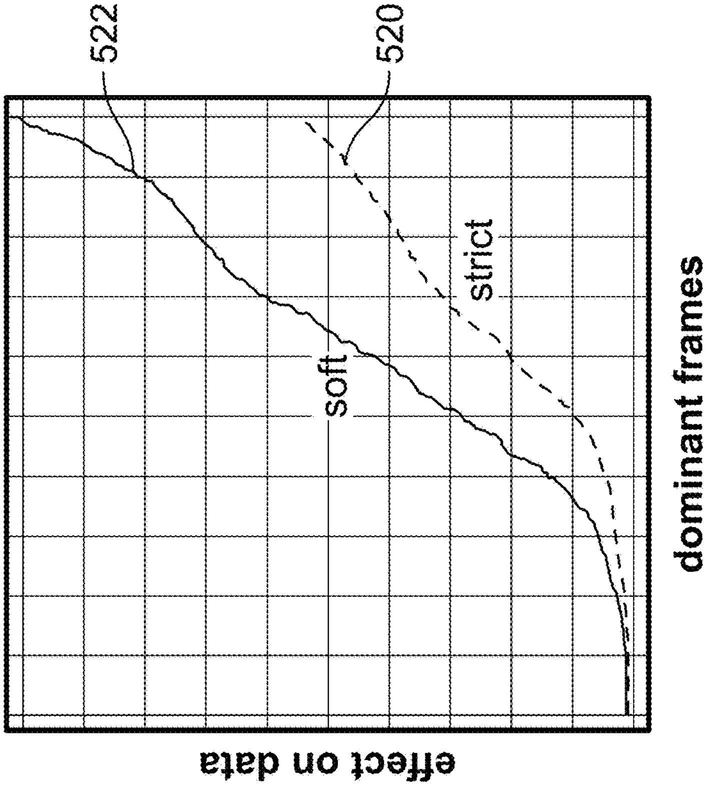
FIG. 5E illustrates how all dominant poses carry effect on the source mocap data, in accordance with some embodiments of the present specification.

FIG. 5E shows how all dominant poses have an effect on the entirety of the source mocap data. If any frame or PDP is taken and its cost is graphed over all data, the graph will show spikes at frames very different from it, and low values at similar frames. This implies that any change introduced to the PDP should affect those low-cost portions of the data as well, since they are so similar to PDP in question. Effectively, it can be reasoned that the whole of the data could be described with a number of non-overlapping samples (PDPs). In turn, it can be reasoned that the more the number of samples used, the higher the fidelity of such description. Consequently, there must be a convergence point where "just enough" PDPs are used to describe the data "as well as possible".

Referring to FIG. 5E, a first curve 520 corresponding to "strict" is indicative of direct cost comparison, and a second curve 522 corresponding to "soft" is indicative of effect via children proxy. For example, considering PDPs A, B and C-if A to B is 50% and B to C is 50%, it can be assumed that A to Cis 25%. That is, say the effect of A on B or B on A is (1−cost [A, B]), clamped between 0 and 1. Then, if A has the effect of 0.5 on B, and B has effect of 0.5 on C, A's effect on C can be estimated as 0.5^2=0.25. However, imagine that directly measured cost [A, C] is 1.0, thus direct effect of A on C seems to be 0. So, "strict" effect is measured directly and is 0. "Soft" by-proxy effect is measured indirectly and is 0.25.

FIG. 5F shows the uniqueness of each dominant pose or PDP over the entirety of the source mocap data. It should be appreciated that the purpose of FIGS. 5E and 5F is to show that the distribution of cost of PDPs in the mocap data is not linear; basically, some PDPs are more mundane/have many similarities, and some are quite unique. This is the foundation for looking into calculating the "effectiveness" of PDPs to understand how their number can be minimized.

Referring now to FIG. 5F, again, the first curve 520 corresponding to "strict" is indicative of direct cost comparison, and a second curve 522 corresponding to "soft" is indicative of effect via children proxy. The most unique dominant poses or PDPs (i.e., about 15% of the source mocap data), if not discarded, will need to be stored but, perhaps, in a lossy way since they are rarely met in the source mocap data. However, half of them are mirrored (if a symmetrical character, for example, a character having no case of "weapon in left hand" or "limping on right foot" is taken, the data can be mirrored and similarities can be easily found between some mirrored and unmirrored PDPs; for example, every left step has similarity to every right step, mirrored), so the number for this example is actually about 140 dominant poses. The least unique ones (about 65% of the source mocap data) should be stored at full quality; however, their number will be low, since each of them is repeated at least 10 times.

In some embodiments, a minimum set of dominant poses can be determined that describe the whole source mocap data. For this example, it is either 286 ("strict") or 198 ("soft").

Thus, for the current example, 3200×2=6400 frames of source mocap data is represented by 485 dominant poses and further by 198 minimal master poses or PDPs, representing 3.5 minutes of source mocap data with 6.5 seconds worth of data; and most of these poses are unique, meaning 85% of the data is represented with 30% of the poses. It should be noted that the frame count is initially doubled because the character used in the particular data set is symmetrical allowing for all data to be mirrored. Therefore, the system is capable of storing a one-foot forward step instead of a discrete right foot forward step and left foot forward step.

Figure 6A:
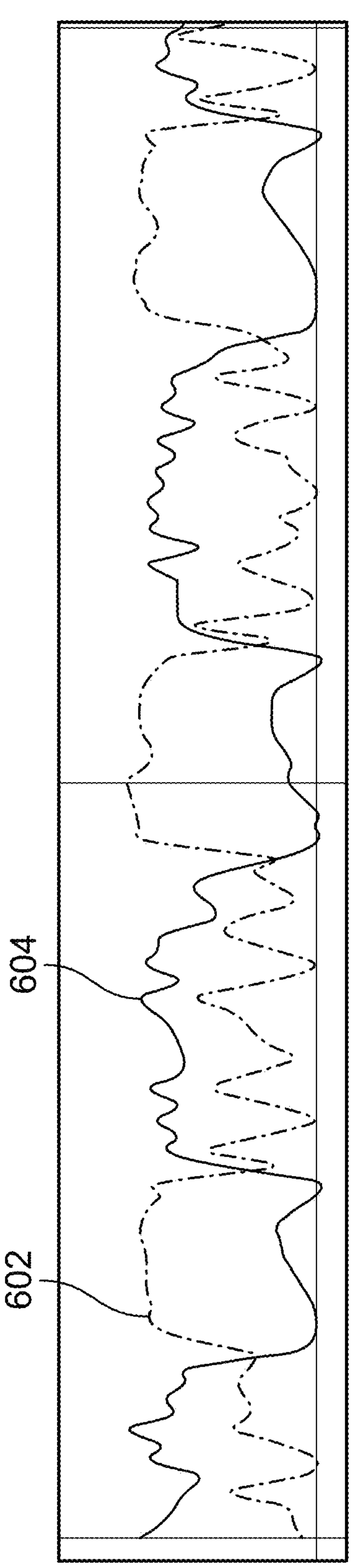
FIG. 6A illustrates visualization of effect of two master poses over timeline, in accordance with some embodiments of the present specification.
Figure 6B:
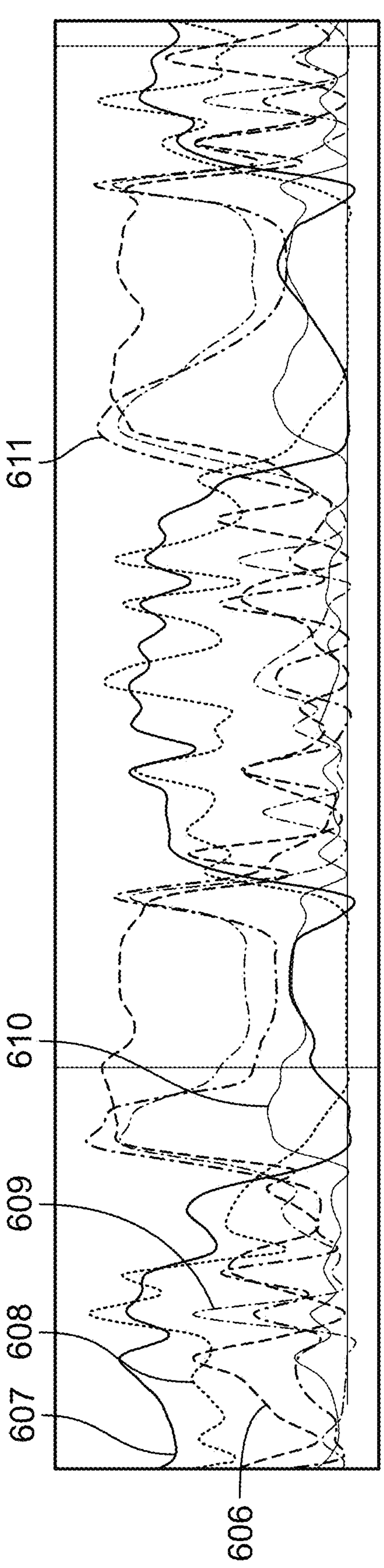
FIG. 6B illustrates visualization of effect of six master poses over timeline, in accordance with some embodiments of the present specification.

As another illustrative example, FIG. 6A illustrates a visualization of the effect of two master poses or PDPs: a first master pose 602 and a second master pose 604 over timeline. It can be inferred, therefore, that all "original" PDPs in a sequence could be replaced with pointers to this small subset. As yet another illustrative example, FIG. 6B illustrates a visualization of effect of six master poses or PDPs: a first master pose 606, a second master pose 607, a third master pose 608, a fourth master pose 609, a fifth master pose 610 and a sixth master pose 611 over timeline. It can be inferred, therefore, that portions of data would be replicated with more fidelity (more accurately) if six master poses or PDPs are used instead of two.

In embodiments, to generate the graph structure, the motion synthesis module 125 is further configured to add a plurality of transitions based on successive dominant poses, frames or PDPs present in each master pose node or group such that each of the plurality of transitions includes Root transform offset and a duration. Also, a further plurality of transitions may be added based on similarity and connectivity requirements. For maximum flexibility, in some embodiments, the graph structure needs to be strongly connected.

Thus, say there is a pose, PDP 100, that is achieved quite often. Unfortunately, little data was captured for it, and it can only lead to pose 101 with cost under 0. So one is often required to force it to pose 200 and pose 300, with costs of 2.0 and 3.0 respectively. By "forced", it is meant that from a state of having pose 100 we are often required (by user or AI) to perform actions uniquely associated with pose 200 or 300—perhaps, those are roll left and roll right. Every time a connection is performed with quality cost of over 1.0, forced by other factors, we can output it to the list of forced bad connections. Such list then can be exposed to animators as examples of motions which need a more artistic "bridge", either to be factored into the next mocap session (make actor do many sideways rolls) or created manually, for example.

Adding New Content

Any new content or mocap data, that is added to the database system 120, goes through the same process of graph structure construction, as described above in this specification, thereby allowing expansion of an existing list of master poses and their connections. Thus, when new content or mocap data is added, the motion synthesis module 125 is configured to determine the center of mass (COM) and Root per frame, measure the work done, use that to assign dominant poses or PDPs, compare new PDPs with existing ones, output/update PDPs, their respective connectivity and costs per connection, generate the hierarchal reduction matrix (HRM) or pyramid and determine the convergence level of the HRM.

It should be appreciated that, since the systems and methods of the present specification do not store a blend tree but sparse data points with their capacity of linking together over time, there is a drastic decrease in the footprint. Further, the master pose nodes can have several LOD's or basically be nested. As a result, a varying number of master poses can be used across different platforms, with the difference being not the full range of character motions, not the quality of them, but the versatility allowed. Thus, there would be a core set of master poses dealing with locomotion, and branching from it, a number of interaction sets, all connected through some master pose.

Data Stored

In embodiments, for each of the resulting set of master poses or PDPs, at least the following data is stored in the database system 120: a) velocity data indicative of an average displacement of body parts over a past frame using point cloud, b) acceleration data, c) force invested or spent (average force acting on each unit of body; actual location compared to predicted one based on previous location, velocity, gravity), d) location and orientation of center of mass (COM) of a body pose, c) location and orientation of Root, f) any tags for events (single frame) or states (duration), including "deprecated" tags which exclude portions of data from calculation, and any tags game logic may query, g) current transforms and velocities, h) index of PDP, i) address of PDP—that is, file and frame, j) list of similarity costs to all other PDPs, k) a list of dominant poses or PDPs affected (that is, PDPs similar to current one (cost under 1.0)), including weights (costs, or possibly soft/strict "effect" described earlier in this specification), l) reference/pointer to closest similar PDP with respective cost, m) original predecessor and successor PDP—that is, a list of incoming master poses or PDPs (predecessors on a timeline) with costs of blending as well as a list of outgoing master poses or PDPs (successors on the timeline) with costs of blending, n) number of possible predecessors and successors in current data with cost <=1.0, as well as offsets to each in space and time, o) any user defined tag (such as, for example, "sneeze"), p) any information related to collision object transform relative to Root, q) any information related to body parts colliding, and r) any information on context outside that derived from anatomical pose, such as amplitude of speech etc. It should be appreciated that, in one embodiment, the present invention is directed to a non-transitory computer readable memory comprising this data structure.

In some embodiments, at least following data is also stored in the database system 120 for each dominant pose: a) address in animation or mocap data file and specific frame, b) pointers to other nodes which a current one may be replaced with in different levels of master nodes, and cost of such replacement, c) any set of tags (for events, states), d) linear velocity and position, and d) successor' and predecessor data such as, but not limited to: i) index of other node, ii) connection quality cost, iii) Root linear and angular offset transform, iv) capacity for translation scale (footstep scaling-a mechanics which scales horizontal offset over time for Root, pelvis and foot IK nodes, preserving upper body. As a result, the character seems to cover more or less distance using the same core animation), v) connection length in frames, vi) capacity for time scale (time warp—that is, fluctuation of the motion playback speed. This is performed based on the amount of velocity per frame, meaning fast motions get less warping and slow motions have higher capacity to be sped up or slowed down with minimal artistic error), vii) connectivity to self (i.e., capacity to loop), and connectivity to saturate the graph structure (i.e., capacity to reach each other dominant pose). It should be appreciated that, in one embodiment, the present invention is directed to a non-transitory computer readable memory comprising this data structure.

Characteristics and Benefits of a Graph Structure

Generation of a graph structure, of the present specification, enables the source motion data to be viewed as a 4D (four dimensional) object which is composed of a plurality of master pose nodes and their influences over the source motion data. Transitions from any dominant pose to any other dominant pose are also included in the graph. The graph structure can be represented as a procedurally generated nested state machine generated for each required start and target state.

The graph structure has a plurality of characteristics. For example, all of the dominant poses required are art friendly. The artists can think of it as a pose library generated for them. Unlike the classic pose library, this one is based on data connectivity, and is much denser, allowing multiple branch points per second. This supports a realistic yet controlled approach to the sculpting of any motion.

Again, for most solutions, multiple possible paths can be found and their costs compared, wherein the comparison can be based on specific needs at the time of query, and can be distributed over 'N' frames. This allows game logic to not only set desired start and goal states but introduce any optional number of states to reach in the process. In turn, this means fast reaction time and good responsiveness yet high realism of an AI-driven animation system.

Additionally, any part of the animation data (PDPs, in relation to capacity of the character to achieve desired motions/actions) is now easy to analyze for its importance. There is also a direct byproduct as knowledge of areas where the data is too sparse (add more) or too dense (deprecate). Stated differently, this approach allows for an analysis of cases where the connectivity is too low or too high-providing an insight of which motions to add to the system. For example, there is no need to "guess" the number of special idles to generate. Since any playback is being tracked during any game session on developer and quality assurance side at least, a good insight can be had into which PDPs are achieved most frequently, and which are never used.

The graph structure has a plurality of benefits such as, but not limited to: a) enabling fully automated transitions, b) reducing redundancy in animation data, c) representing motion data at a higher level of abstraction, allowing groups of poses to be treated as a whole for editing or stylization, d) offering potential for (lossy) data compression without limiting possible motion, e) allowing offline data analysis to identify bad transitions or areas where further animation data is needed, f) enabling improved responsiveness compared to conventional motion graphs, g) providing more predictable results when adding or removing animation data compared to the conventional motion matching technique, and h) providing ability to support complex motion constraints.

The system of the present specification enables a plurality of options such as, for example: offline/runtime motion stylization and removal of respective data from the footprint, a population of possible goal-to-reach space for each pose, an improvement of "immediate impossible blend to" solution, a packing required pose data to indexed list for cheap data transfer, pose and time warping for improved quality and timing of targeted events, solving against unusual constraints, constraints over time (full body to speech, dance to location, etc.), quality of motion matching, and control of blend trees.

A Method of Generating a Graph Structure

Figure 7D:
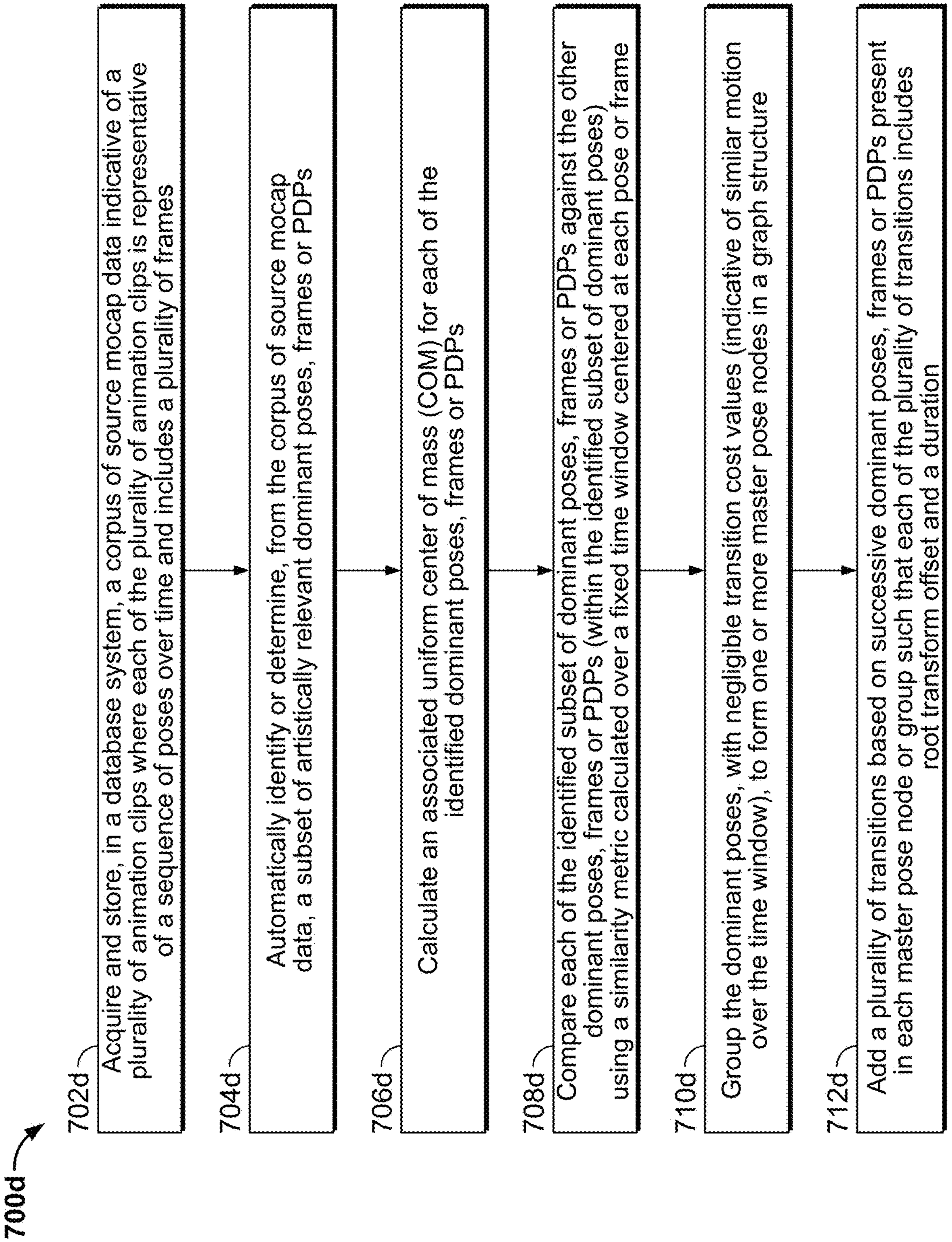
FIG. 7D is a flowchart of a plurality of exemplary steps of a method of generating a graph structure configured to enable controlled character motion synthesis, in accordance with some embodiments of the present specification.

FIG. 7D is a flowchart of a plurality of exemplary steps of a method 700 of generating a graph structure configured to enable controlled character motion synthesis, in accordance with some embodiments of the present specification. In various embodiments, the method **700*d* is implemented by the motion synthesis module 125**.

Referring now to FIGS. 1 and 7, at step **702*d*, acquire and store, in the database system 120, a corpus of source mocap data indicative of a plurality of animation clips where each of the plurality of animation clips is representative of a sequence of poses over time and includes a plurality of frames. Alternatively, or additionally, the database system 120** may store hand-authored or procedurally generated data containing fluid realistic motion.

At step **704*d*, the module 125** automatically identifies or determines, from the corpus of source mocap data, a subset of artistically relevant dominant poses, frames or PDPs. In some embodiments, the source mocap data is sampled using a measurement of force invested or spent (that is, work done). The poses or frames corresponding to values of peaks and valleys of a force or work done curve are identified as dominant poses, frames or PDPs.

At step **706*d*, the module 125** calculates an associated uniform center of mass (COM) and Root for each of the identified dominant poses, frames or PDPs. Root is the space in which animations are played, and also serves as a generalized idea of character placement in the game. COM is useful for many reasons, such as, for example, balance restoration in case of runtime pose changes, lazy pose comparison, physics/ragdoll factor, and any other reason to use COM in accordance with the present invention.

At step **708*d*, the module 125** compares each of the identified subset of dominant poses, frames or PDPs against the other or remaining dominant poses, frames or PDPs (within the identified subset of dominant poses) using a similarity metric calculated over a fixed time window centered at each pose or frame. In some embodiments, the similarity metric is a comparison cost value determined by dividing the distance between some node of PDP 'A' and the same node of PDP 'B', by an average velocity of the two PDPs. Thereafter, taking an average or median result of all nodes combined. In some embodiments, the similarity metric is used to define, establish or otherwise form a convergence set of PDPs.

At step 710*d*, the module 125 groups the dominant poses, with negligible transition cost values (indicative of similar motion over the time window), to form one or more master pose nodes in the graph structure. Thus, the graph structure encapsulates a plurality of master pose nodes where each of the plurality of master pose nodes includes a group of constituent dominant poses indicative of a similar motion or animation.

At step 712*d*, the module 125 adds a plurality of transitions based on successive dominant poses, frames or PDPs present in each master pose node or group such that each of the plurality of transitions includes Root transform offset and a duration. A further plurality of transitions is added based on similarity and connectivity requirements. In embodiments, the term 'transition' refers to the allowed pairs of PDPs to select later in an animation sequence. For example, suppose there are PDPs 'A', 'B' and 'K'. In accordance with some embodiments, if a user-defined cost threshold is 0.5 then PDPs with comparison cost values under 0.5 are considered 'sufficiently or successfully similar' and allowed for transition. Now, if the comparison cost (B, K)=0.4, then the transition from PDP 'A' (that is a native predecessor of PDP 'B') to PDP 'K' is allowed. Stated differently, PDPs need to be 'sufficiently or successfully similar' in order to qualify as potential transition pairs, in which case they are then allowed to be successive.

In embodiments, the module 125 generates motion at runtime by applying one or more dominant poses from the one or more master nodes and by applying one or more transitions that match a plurality of control parameters, wherein the plurality of control parameters describe a desired motion of a character in a multi-player online game. Thus, an online multi-player gaming system is configured to feed on pre-processed data, indicative of a graph structure, that is leveraged at runtime to find best possible motion to play or synthesize for any set of animation goals. The generated runtime motion is mandatorily deterministic in case of user-side or player-side pose construction.

It should be appreciated that the approach of the graph structure can be used for other applications as well such as, but not limited to, cinematics, blocking in Autodesk Maya software, and to generate training data for machine learning. The following are illustrative non-limiting examples of the use of the approach of the graph structure in other applications:

In a first example, the approach of the graph structure may be used to block in motion over time (in cinematics or a regular pipeline). If it is assumed that an animator has a timeline between frames 0 and 100, at frame 0, they may choose one of a plurality of PDPs and place it in a certain world location. They may then choose any preferred PDP for frame 100, and any preferred location. They may then repeat the process inside the timeline as well. The approach of the graph structure, of the present specification, can then be used to generate any number of possible PDP sequences to fit the timeline, world transforms, and desired PDPs blocked in by the animator, thereby, creating a number of possible animation sequences for the character to achieve all those poses sequentially.

In a second example, a semi-procedural graph structure approach may be used. For example, an artist may specify some start area and target area, and one by one the approach of the graph structure, of the present specification, can be used to choose a random location in the start area and find means to navigate to the random location in the target area. This is repeated for multiple characters, keeping in mind spatial transforms of "already solved" ones to avoid collision. Such an approach can service quick prototyping (or high-quality simulation) of crowds.

Further, machine learning solutions can benefit by learning all transitions allowed (defined by an artist, for example with cost $<0.1$), to then generate new transitions between poses not in the learning set.

Secondary Animation (SA) Module 126

Conventional methods for secondary animation are limited in the following ways, for example: there is often a hard limit on the number of secondary assets or elements allowed to move independently from the core character body; large folds and flaps typically do not unfold; oversized and draping parts hang over the body; layered clothing does not slide; capes, hoods and cloaks do not wrap correctly; long sleeves do not lift; wide sleeves do not squish; skin tight folds stay static, and metal parts bend and stretch, among other limitations.

There is need for realistic animation of secondary assets that are: reactive of runtime forces, cheap or low cost to run per frame and are low on footprint (that is, are lightweight), have scalable quality and allow reuse for combinations, automated as much as possible while at the same time being artist-facing for creation and iteration, and have a certain amount of stability and predictability.

Accordingly, the present specification is also directed towards a method of generating secondary animation resulting from core character motion that further includes secondary assets such as, for example, muscles, skin, clothing, hair, and props or accessories. An objective of the present specification is to be able to animate the secondary assets separately or independently from the core character body.

Referring back to FIG. 1, in accordance with aspects of the present specification, the one or more game servers 105 is configured to further provide or implement a secondary animation (SA) module 126. The SA module 126 includes a plurality of instructions of programmatic code which when implemented support animating a secondary asset, associated with an animated character, independently of the body of the animated character.

Figure 8:
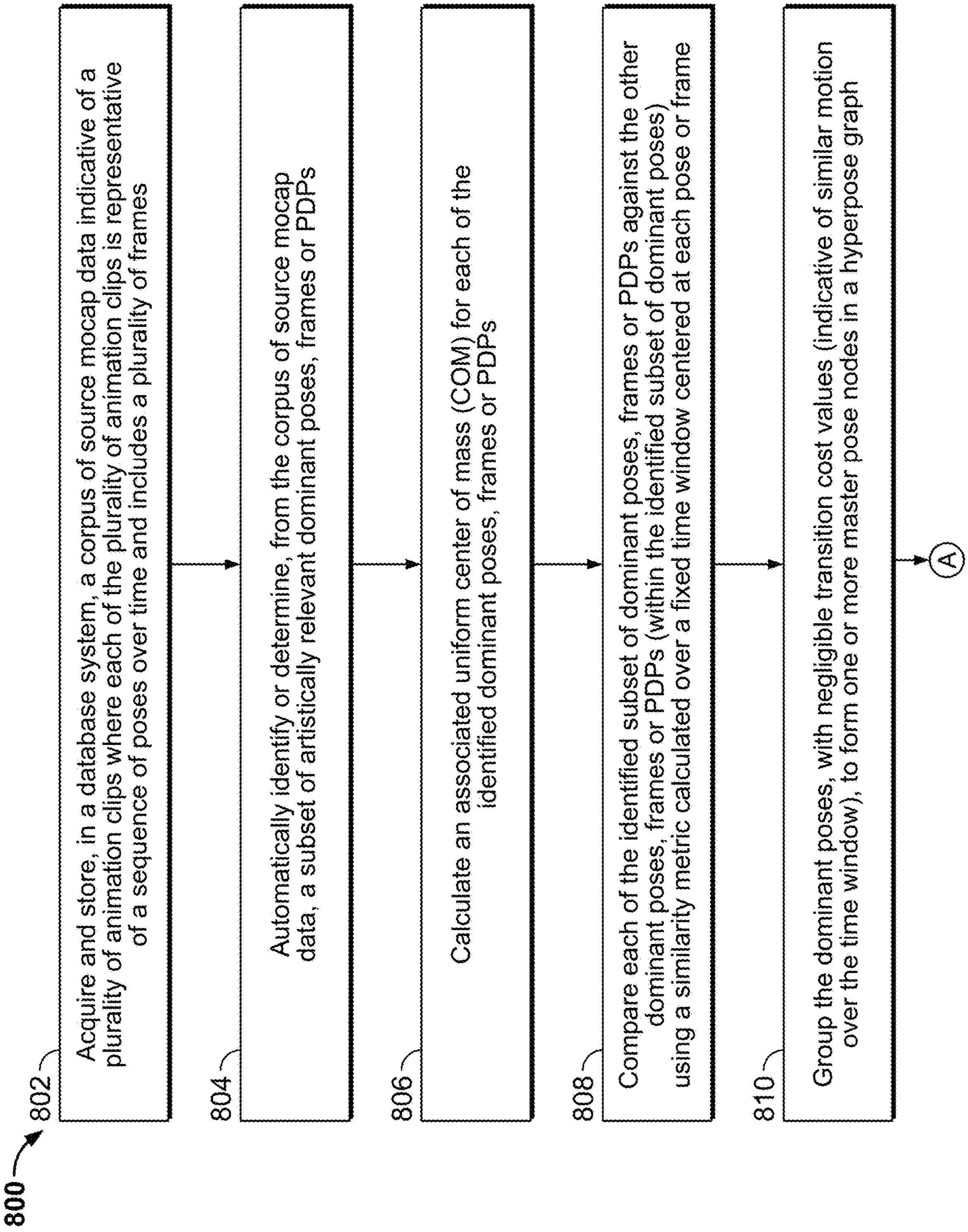
FIG. 8 is a flowchart detailing a plurality of exemplary steps of a method of animating a secondary asset associated with an animated character, in accordance with some embodiments of the present specification.
Figure 8:
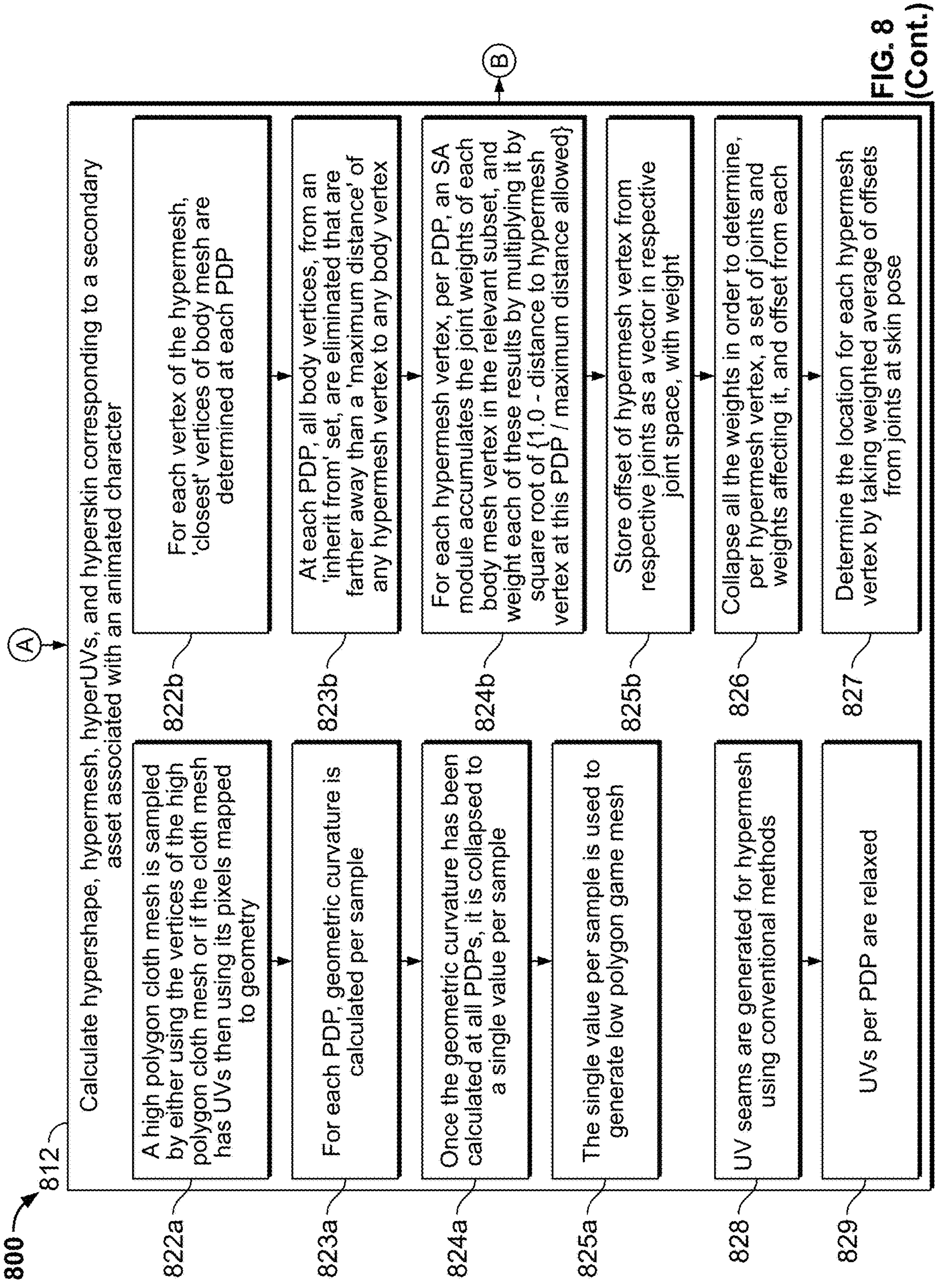
Figure 8:
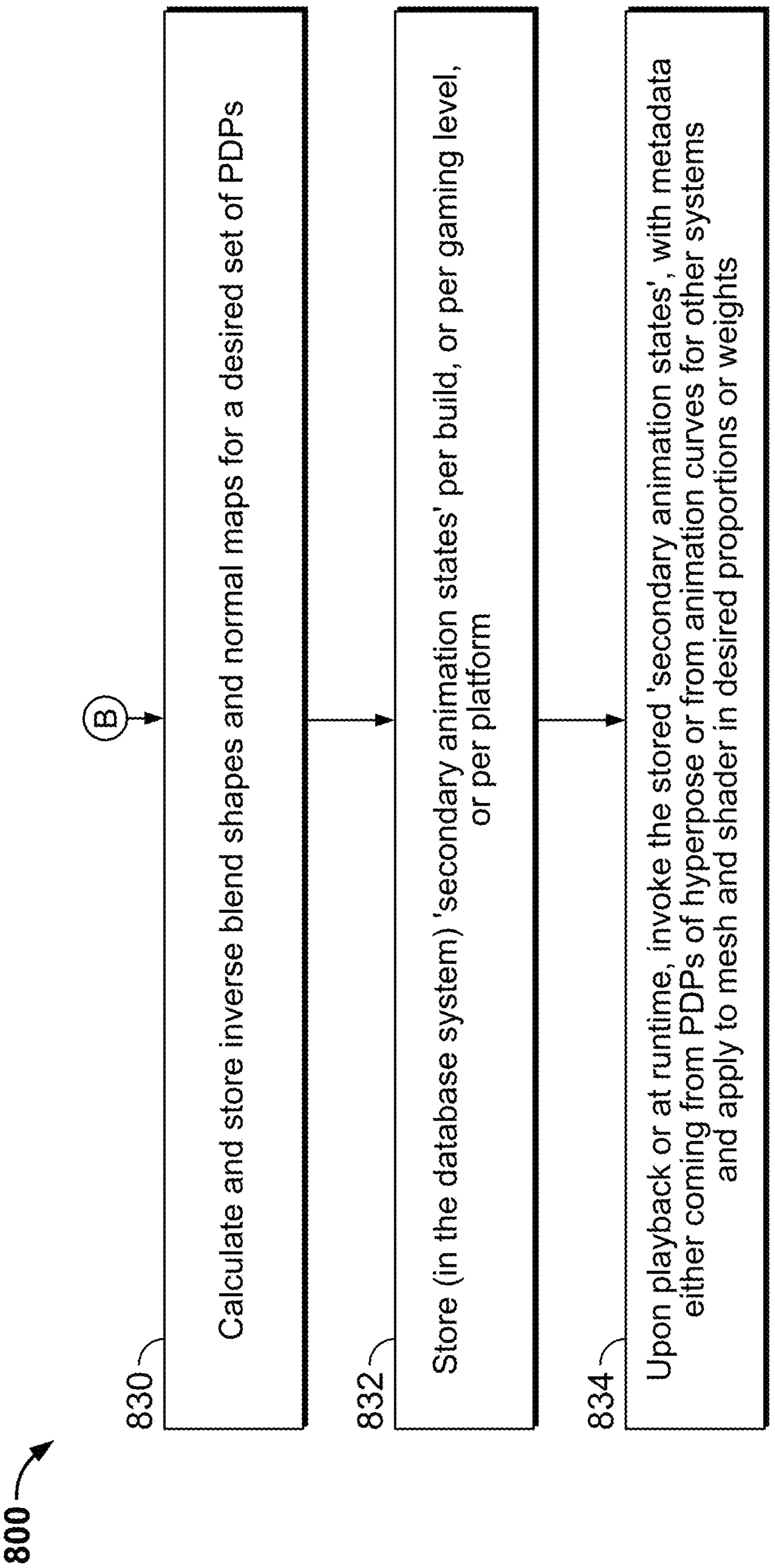

FIG. 8 is a flowchart detailing a plurality of exemplary steps of a method 800 of animating a secondary asset associated with an animated character, in accordance with some embodiments of the present specification. In various embodiments, the motion synthesis module 125 and the SA module 126 are configured to implement the method 800. In some embodiments, the secondary asset includes, but is not limited to, cloth, clothing or garment, muscles, skin, monster or non-human body features, hair, fur, props, and accessories that may be associated with the animated character.

Referring now to FIGS. 1 and 8, at step 802, the one or more game servers 105 acquire and store, in the database system 120, a corpus of source mocap data indicative of a plurality of animation clips where each of the plurality of animation clips is representative of a sequence of poses over time and includes a plurality of frames. Alternatively, or additionally, the database system 120 may store hand-authored or procedurally generated data containing fluid realistic motion.

At step 804, the module 125 automatically identifies or determines, from the corpus of source mocap data, a subset of artistically relevant dominant poses, frames or PDPs. In some embodiments, the source mocap data is sampled using a measurement of force invested or spent (that is, work performed). The poses or frames corresponding to values of peaks and valleys of a force or work performed curve are identified as dominant poses, frames or PDPs. In embodiments, the identified dominant poses, frames or PDPs are stored in the at least one database system 120.

At step 806, the module 125 calculates an associated uniform center of mass (COM) and Root for each of the identified dominant poses, frames or PDPs. Root is the space in which animations are played, and also serves as a generalized idea of character placement in the game, as described above. COM is useful for many reasons, such as, for example, balance restoration in the case of runtime pose changes, lazy pose comparison, physics/ragdoll factor, and any other reason to use COM in accordance with the present specification.

A runtime pose change refers to any operation that, during gameplay, invalidates the original transforms of character joint hierarchy coming from respective animation clips. Non-limiting examples include: runtime retargeting, IK (Inverse Kinematics) chain manipulations, game physics, and animation blending. Lazy pose comparison refers to running the pose comparison during gameplay but using a smaller number of nodes than would be used at runtime. For example, fast comparison can be produced by comparing velocities, etc. of only 6 predetermined joints instead of a full set. Physics/ragdoll factor refers to causes for runtime pose changes as known to persons of ordinary skill in the art.

At step 808, the module 125 compares each of the identified subset of dominant poses, frames or PDPs against the other or remaining dominant poses, frames or PDPs (within the identified subset of dominant poses) using a similarity metric calculated over a fixed time window centered at each pose or frame.

At step 810, the module 125 groups the dominant poses, with negligible transition cost values (indicative of similar motion over the time window), to form one or more master pose nodes in the graph structure. Thus, the graph structure encapsulates a plurality of master pose nodes where each of the plurality of master pose nodes includes a group of constituent dominant poses indicative of a similar motion or animation.

The module 125 is also configured to add a plurality of transitions based on successive dominant poses, frames or PDPs present in each master pose node or group such that each of the plurality of transitions includes Root transform offset and a duration. A further plurality of transitions is added based on similarity and connectivity requirements.

Figure 9:
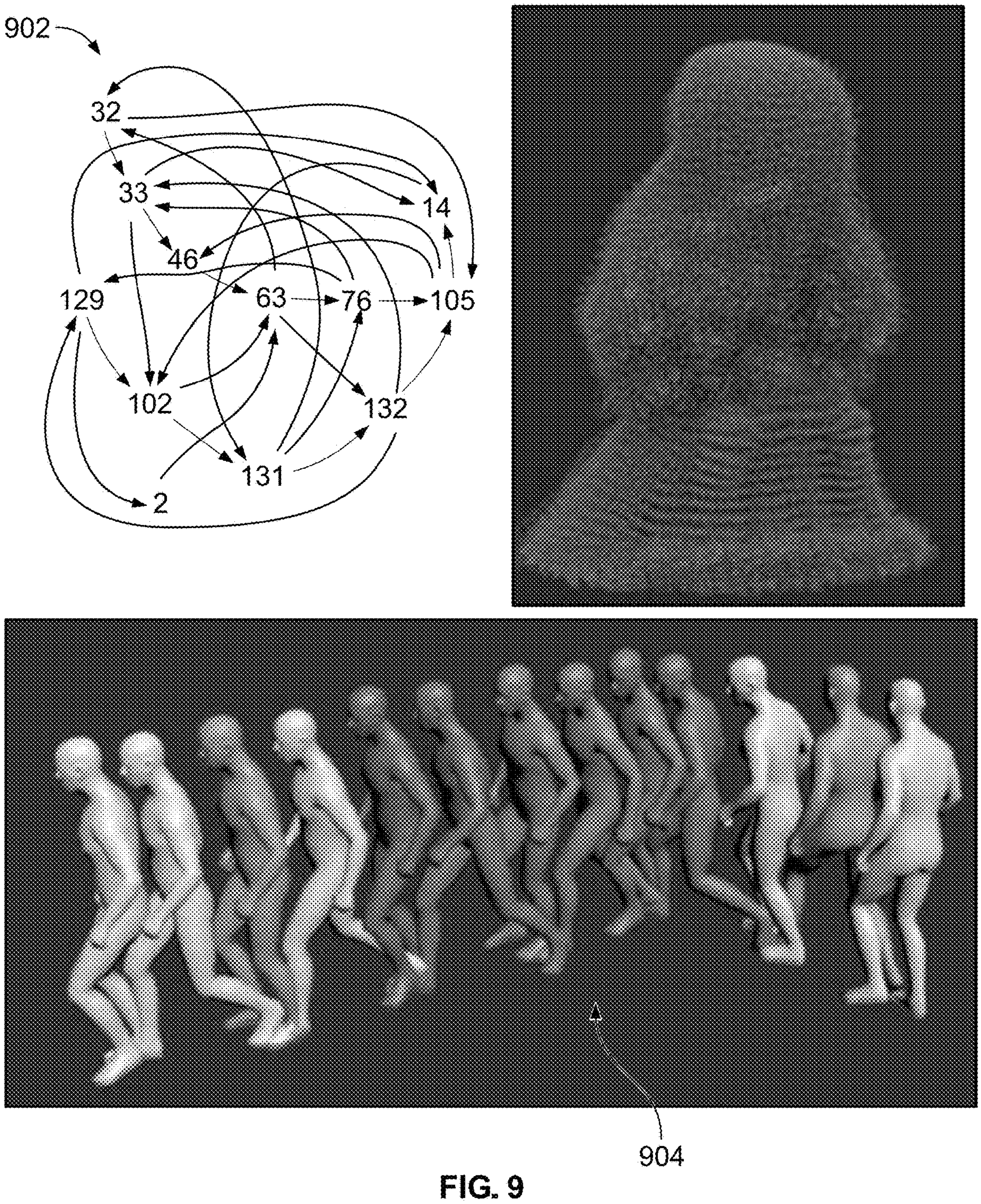
FIG. 9 is an illustration showing a concatenated ("concat") reel based on identified most prominent PDPs, in accordance with some embodiments of the present specification.

In some embodiments, as shown in FIG. 9, the complete mocap data or animation sequence is represented with one short clip 902 (also referred to as concat reel, concatenated reel, motion distillation, or principal pose concatenation) based on the identified most prominent PDPs 904. While the total mocap data may include hours of motion and thousands of clips, a distilled version 902 is generated on demand based on desired accuracy or clip length (for example, 100 frames). Adjustments made in concat reels are stored per PDP, so they are easily recalculated on demand with zero data loss. In some embodiments, the most prominent PDPs may refer to a convergence set of PDPs 904 that represent the weighted best combined descriptions of the mocap data. Thus, concat reel represents a method of displaying PDPs originating from multiple time locations of multiple animation clips or files. A concat reel can be extended during production as new mocap data is added to the game. Generating a concat reel involves identifying the best 'N' number of poses (or animation frames) representing the motion as a whole, with user-prescribed and customizable 'N', and a way to represent those poses as one uninterrupted animation sequence which is short enough to be human friendly for adjustment (as opposed to, for example, a million frame long sequence which is not compatible with human adjustment in DCC (digital content creation) tools, such as Maya).

At step 812, the SA module 126 calculates hypershapes, hypermeshes, hyperUVs, and/or hyperskins corresponding to the secondary asset. It should be appreciated that the SA module 126 also supports classic human-made meshes, UVs, skin weights, among others. However, it is preferred to calculate mathematically optimal hypershapes, hypermeshes, hyperUVs, and/or hyperskins, and solve for those. Thus, each of these elements can either be generated by the SA module 126 or may come from the user. For example, the SA module 126 may use skinned mesh posed by an artist, and mathematically only optimize the UVs. Alternatively, the SA module 126 can generate the mesh and UVs but inherit human-prescribed skin pose and skin weights.

In some embodiments, the calculation of the hypershape, hypermesh, hyperUVs, and hyperskin is based on at least the convergence set of PDPs, if not all PDPs (for example, determine the best topology for left foot forward and right foot forward PDPs). In some embodiments, the calculation of the hypershape, hypermesh, hyperUVs, and hyperskin factors in deformation and curvature stress of a given motion.

In embodiments, hypershape involves digitally sculpting a default geometrical shape of the secondary asset based on all of the shapes the asset achieves, based on weighting. The hypershape has a plurality of prerequisites such as, for example, a) target joint hierarchy, b) base body, skinned, with skin pose, c) a version of the asset in question deforming over time (supposedly high-resolution and simulated), and d) a game mesh of the asset in question. With the plurality of prerequisites, it is mathematically possible to define a unique unambiguous set of vertex locations for game mesh in a given skin pose.

In some embodiments, the hypershape refers to a best "skin pose" shape of the secondary asset for a pose such as, for example, T-pose, A-pose, or Fetus pose. The T-pose is indicative of a character standing with all limbs, spine and neck fully extended, legs pointing down, and arms pointing to the sides. The A-pose is similar but has arms slightly lower at 45 degrees angle, and legs slightly spread. Both T-pose and A-pose do not have one unique set of transforms to reference and are descriptive terms. The Fetus pose is indicative of a character pose achieved by averaging out all poses of animation, per joint, and usually (but not always, depending on motions used) presents the character with slightly curved spine and neck, slightly bent limbs, positioned slightly above the ground.

Figure 10:
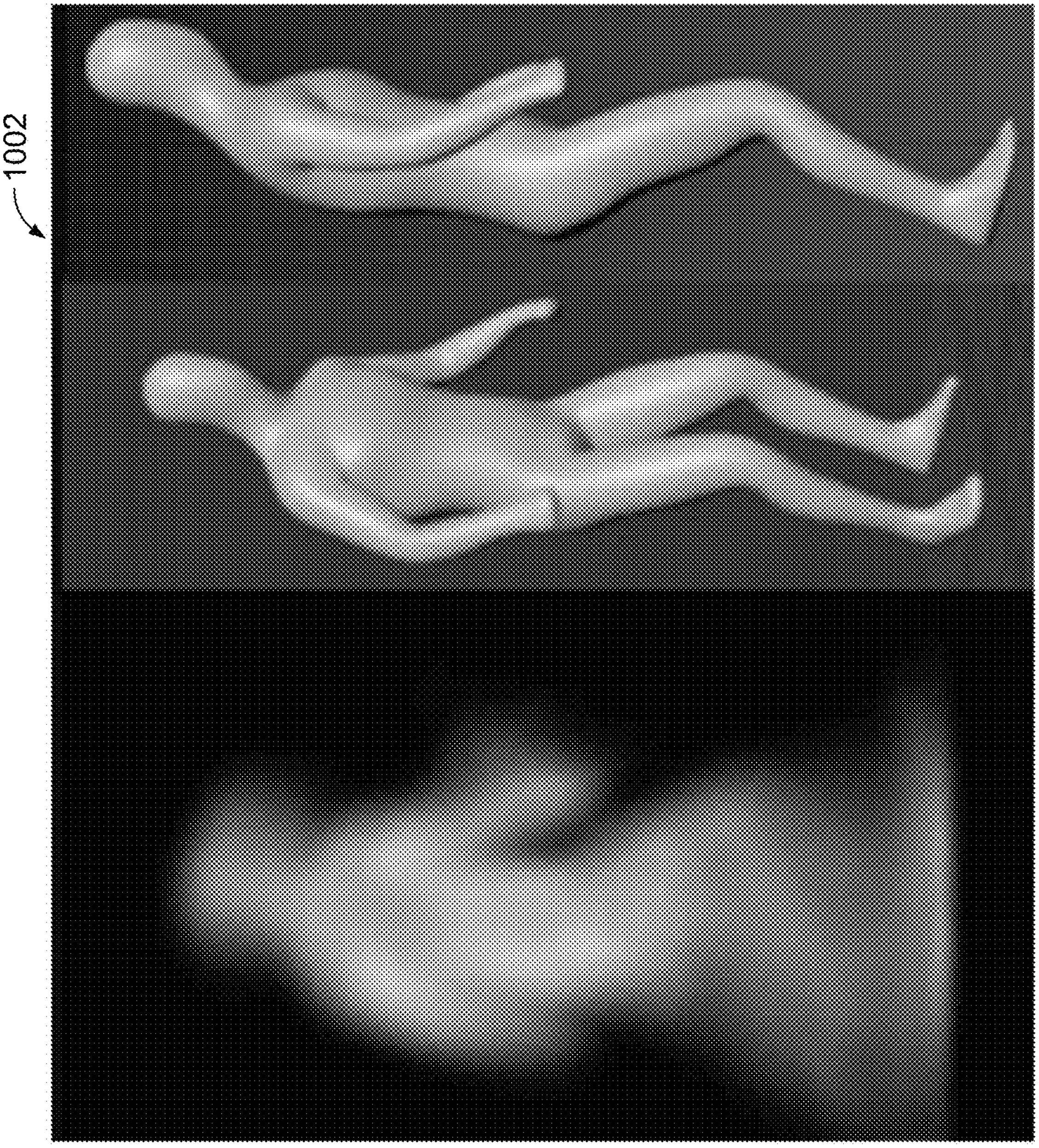
FIG. 10 is an illustration of a fetus pose, in accordance with some embodiments of the present specification.

FIG. 10 shows a fetus pose 1002, in accordance with some embodiments of the present specification. The Fetus pose 1002 is a mathematically identified lowest error pose (related to joint transformations averaged, per joint, from all transformations it achieves in a given set of motions) for hypermesh, hyperskin, and hyperUVs, minimizing the deviation that will be introduced once the character starts moving. Conventionally, it is typical that some skin pose is selected, meshed and skinned, and then it becomes a subject of constant updates as the character is tested against animation poses (not taken into account by the rigger or modeler). In some embodiments, the Fetus pose 1002 is a default/reference pose for a 3D model of the character before it is animated. Thus, the Fetus pose 1002 relates to a set of joint transforms which represents a median of weighted poses or hyperposes and affords minimizing the joint deformation error. Any mesh can be adjusted to the Fetus pose and the joint weights assigned will have minimal average error for all possible character motions.

The Fetus pose 1002 is not human friendly therefore, in some embodiments, an animator or modeler is initially allowed to sculpt-in a character pose he finds convenient, whereby the sculpted character pose is then mathematically adjusted to Fetus pose. Subsequently, an artist will manually review/correct what they see fit. Thus, while modelers can create characters in a pose of their choosing, the SA module 126 supports automatic adjustment (subject to artistic review) of those meshes to Fetus pose or any other desired pose (such as, for example, T pose or A pose).

In some embodiments, the SA module 126 stores (in the database 120) the Fetus pose 1002 as an in-between asset serving as a bridge or transition between a human friendly sculpted pose to a mathematically optimal pose. The Fetus pose 1002 is referenced by the human posed assets and updated as received by the source. For assets that are based on the Fetus pose for skinning, if the pose is changed for any reason, then the assets should be updated automatically and accordingly by the SA module 126 (and not via manual adjustments).

In embodiments, hypermesh refers to a mesh topology that is informed by density distribution, which, in turn is informed by stress per point source data. Specifically, mesh topology is based on density which is derived from stress per point data, which, in turn, is calculated from the deformations of a high poly (for example, simulated, sculpted) asset over time. In embodiments, stress per point data is calculated using the following method: a high poly asset has associated therewith a plurality of vertex maps storing vertical and horizontal positions on a 2D texture (UV maps); for each PDP frame, a curvature of high poly per vertex is calculated and stored as either vertex color or texture; and all values for each vertex across all PDPs are averaged to produce a value representing an amount of stress a vertex is put through. Once the amount of stress for all vertices of the high poly asset is known, the total amount of stress per point on its surface is effectively known. This value is then factored into re-topologizing the high poly to receive a low rez mesh with triangle density higher on stress points and lower on "flat over time" points. As a result, there is a greater capacity to showcase detail at proper areas or locations.

It should be appreciated that the hypermesh topology is not defined by an arbitrary state coming from a digital sculpting tool such as, for example, Zbrush or a 3D scan. Instead, the edge loops and mesh density are dictated by shapes that may possibly be achieved, and their chance to be achieved (that is, the quality of the topology of a deforming object is based on the capacity to support the deformations required). This allows generating the best vertex placement for all LODs (level of details). A low-resolution topology of any target triangles or vertex count can be generated based on the deformations required.

Thus, if an asset receives deformations over a motion set, the shape change of the asset can be tracked over its constituent parts. Typically, the deformations are defaulted to vertices, however it is also possible, and in some cases, (such as with artistically insufficient vertex density for micro detail representation) preferable to, instead, store deformation information in pixels of a texture generated based on the mesh UV mapping. In some embodiments, such deformation information is curvature (at vertex or at pixel), since high curvature directly implies denser topology.

The term 'UV' refers to a two-dimensional texture coordinate system, referred to as UV texture space. The UV texture space uses the letters U and V to indicate the axes in 2D and facilitates the placement of image texture maps on a 3D surface.

In embodiments, hyperUVs refer to mesh UV coordinates that are informed by deformation over motion space, which leads to increasing area for expanding faces. It should be appreciated that UV coordinates proportioned and relaxed to a static state are of lower accuracy in relation to possible deformations achieved than those based on such deformations. While both have "baked-in" errors, these errors can be minimized. That is, the errors can be minimized where mesh UV coordinates, that are informed by deformation over motion space, are used. Thus, UVs adjusted using a graph structure provide more accuracy per any possible state.

A first example may be represented by a character which has vertex transforms, UV coordinates, and skin weights assigned in a pose with eyes open. If the upper eyelids are subsequently deformed for an "eyes closed" state, the skin of the upper eyelids may be stretched in one direction to receive a larger surface area. This means that any texture created for "narrow", "eyes closed" UVs will visibly deform.

A second example may be represented by a procedure, typically labelled as "UV relax", which is a mathematical offsetting of UV coordinates to achieve, per triangle, parity between edge length relations on UVs and in 3D space. When such "relax" is applied to a single pose, it is of course immediately less valid for any other pose the character might achieve, since in 3D the edge lengths of each triangle will change. Since UVs are currently treated as static (because the textures rendered using UVs come as static files), the dependency on single-pose relax can at least be minimized and instead the UV coordinates, most similarly matching all the 3D deformations during motion, be identified.

In embodiments, hyperskin is an assignment of best combinations of joints and best weights for each per vertex to represent the data. If a certain point on a mesh deforms over motion, then for all frames, all of its respective transforms driven by skin weights can be gathered. If, however, the mesh receives secondary deformation from blend shapes, among other secondary methods, (such as in case of physical simulation, for example), then all transforms driven by those secondary methods can also be gathered. Thereafter, the offset (error in representation with skin weights only) can be calculated and, given that the joints are known, a set of weights can also be calculated which would minimize this error. This becomes the hyperskin of the vertex—that is, a set of weights which move the vertex similar to simulation (or other method) using joints only. If other deformations are applied, such as corrective blend shapes in addition to hyperskin, the distance to cover will be minimal, which is advantageous for visual fidelity.

Given a set of joint transforms and corresponding desired vertex locations, the SA module 126 identifies the best possible constraints. In some embodiments, solutions are tailored to desired joint per vertex count and LODs. The result provides a best approximation for any pose. In classic game pipelines, joint-driven meshes ("skeletal meshes", "skinned meshes", etc.) are configured to store, per vertex, a list of joints and respective joint weights (usually normalized). During a vertex shader operation per frame, the new desired location of each vertex is calculated by matrix operations considering offset, transform, and weight of each of the joints in the list. This means that the more joints affecting the vertex, the larger footprint is required to store them, and the more operations to run per frame. For optimization purposes, game engines often have a hard limit introduced to clamp the maximum number of joints affecting any vertex to a number such as, for example, 4 or 8. This is one of the many optimizations performed by game engines that is supported by data generated from aspects of the present specification.

In order to calculate (mathematically) an optimal hypershape, hypermesh, hyperUV, and hyperskin corresponding to a secondary asset the SA module 126, as configured, uses a first plurality of data such as at least one of those indicative of a joint hierarchy, a body geometry with skin weights assigned, a skin pose, an animation sequence, PDPs, and/or high polygon cloth mesh that has been simulated/sculpted and thus changes shape over time (with UVs). Some examples of calculation steps are provided below and are only exemplary and not meant to be limiting.

Calculating Hypermesh

At step 822*a*, the high polygon cloth mesh is sampled by using either the vertices of the high polygon cloth mesh or using, if the cloth mesh has UVs, the pixels of the cloth mesh mapped to geometry.

At step 823*a*, for each PDP, a geometric curvature per sample is calculated.

At step 824*a*, once the geometric curvature has been calculated at all PDPs, the geometric curvature is collapsed to a single value per sample (using, for example, average, mean, weighted average, or any other combination means). The single value per sample is indicative of a general description about how much each sample contributed to the shape definition over the PDPs.

At step 825*a*, the single value per sample is used to generate a low polygon game mesh. Exemplary approaches of generating the low polygon game mesh comprise, in some embodiments: selecting a number (for example, 1000) of most influential vertices (samples with highest average curvature) and removing the rest. Scripts are available which allow for the down-resolution (down-rez) of a high polygon asset based on incoming values such as curvature (at some static pose) or vertex color. Any such scripts may be used with the relevant input replacing the vertex color. In some embodiments, this is achieved using a high poly asset in skin pose, and deformation over time data. In embodiments, the result is that in skin pose, one has arrived at the mesh that is best at describing the asset shape over all the motion—as opposed to the current approach which only considers some static skin pose and thus disregards things such as large transient folds forming over other poses.

Calculating Hypershape and Hyperskin

At this stage, in addition to the first plurality of data, the SA module 126, as configured, uses second data indicative of hypermesh which coincides, shape-wise, with a high poly asset at skin pose. In other words, the hypermesh is 'skin-wrapped' to the high poly asset. That is, each vertex of the hypermesh inherits transforms of some vertices of the high poly asset, and as high poly deforms over time, so does the hypermesh. Thus, for each vertex of the hypermesh, a full set of body mesh vertices is assumed as 'inherit from' to begin with, and subsequently the PDPs are processed. This is very accurate, but the typical approach is to discard the high poly asset. With the given hypermesh topology, the SA module 126, as configured, determines the best possible location for each vertex at skin pose, based on the following steps:

At step 822*b*, for each vertex of the hypermesh, the 'closest' vertices of body mesh are determined at each PDP. In the present specification, "body mesh" differs from hypermesh and is defined as a mesh representing the character body/flesh (which is assumed to be ready if it is intended to simulate any object draped on it).

In some embodiments, 'closest' is defined with an arbitrary number such as, for example, distance≤10 cm. In some embodiments, it is preferred to define 'closest' by calculating the 'maximum distance' of any hypermesh vertex to a body mesh vertex, over all PDPs. This conveys how loose the hypermesh can become over a given motion, based on simulation of high poly, and thus allows for disregarding those body mesh vertices that are further away than the calculated and determined "closest" distances from any hypermesh vertex.

At step 823*b*, at each PDP, all body mesh vertices, from the 'inherit from' set, are eliminated that are farther away than the 'maximum distance' of any hypermesh vertex to any and/or each body mesh vertex. This determines a relevant subset of body mesh vertices which were always close enough to the hypermesh vertex in question.

At step 824*b*, since each body mesh vertex has joints and respective influence weights assigned (that is, 'skin weights'), for each hypermesh vertex, per PDP, the SA module 126, as configured, accumulates the joint weights of each body mesh vertex in the relevant subset, and weight each of these results by multiplying it by square root of {1.0−distance to hypermesh vertex at this PDP/maximum distance allowed}.

At step 825*b*, the SA module 126, as configured, stores offset of hypermesh vertex from respective joints as a vector in respective joint space, with weight.

At step 826, all the weights are collapsed in order to determine, per hypermesh vertex, a set of joints and weights affecting each hypermesh vertex, and offset from each hypermesh vertex. For this process, 'collapsed' is defined as taking a set of weights over samples (PDPs over time) for each vertex (for example, mean, median) of the data to derive one value per vertex. For example, a large prominent fold forming in 50% of the poses would be silhouetted with high value vertices. A large flat area would rarely receive much curvature and thus the "stress" weights for vertices defining such area would be low. "Stress" and "curvature" are differentiated because, in embodiments, the curvature maps have a value of 0.5 for flat areas, with lower values being used for inner convex cases (for example, armpits) and higher values being used for the opposite (for example, the top of a head). Both of these deviations from 0.5 are equally important "stresses", therefore, to derive "stress" value from the curvature abs (curvature*2−1) is used.

At this stage, the number of joints is usually clamped to 'n' (conventional pipelines usually support maximum joints per vertex value of 4 or 8), disregarding any excessive joints with a smallest weight. This is the skin weight data for the given hypermesh vertex.

At step 827, the location for each hypermesh vertex is determined by taking a weighted average of offsets from joints at skin pose. This is referred to as hypershape. Thus, the SA module 126, as configured, determines the hypermesh in skin pose, weighted to joints of the body. The shape of the mesh in this pose is such that contains minimal error for all movements to achieve over the animation, as informed by the simulated high poly. The joint weights are such that the respective vertex will move as close to all PDPs as possible, minimizing the error over all animation data.

Since the following are known: a) the exact desired location of each hypermesh vertex at each PDP from "skin wrap", and b) its location as prescribed by newly calculated skin pose shape and joint weight driven offset, the inverse blend shape set for all PDPs can be generated using conventional methods such as those in Autodesk Maya. The determined skinned hypermesh, as driven by joints during motion, closely approximates the simulated one. It should be appreciated that enabling the inverse blend shape, which corresponds to any achieved PDP, allows complete match of simulated high poly mesh at that pose.

Calculating HyperUVs

At step 828, UV seams are generated for hypermesh using conventional methods (such as, for example, artist defined seams, or seams coming from cloth panels in DCC such as Marvelous Designer, or some automatic unwrapping script known to persons of ordinary skill in the art). Thereafter, UVs per PDP are relaxed, at step 829. UV relaxing is term known in the art for adjustment of the existing UV coordinates of a mesh to minimize stretching and distortion in textures. UV relaxing smooths out the UV layout during unwrapping, ensuring that textures are applied evenly and accurately across the 3D model's surface. In other words, the respective edges between any two vertices in UVs are 'relaxed' in an attempt to stay proportional, lengthwise, to the distance between these vertices in 3D. Classical "UV relaxing" would only take into account one static pose, adjusting the area of triangles on UVs to that of the same triangles in 3D space. Embodiments of the present specification adjust to an average of 3D surfaces of each triangle over time. For example, if a default pose has eyes open, the triangles of the mesh on upper eyelids are squished and have a low area. If the character was to close the eyes at any point (blink), the size of such triangles on UV island would stay the same, and their 3D would become much wider, meaning we would receive stretching of the pixels assigned to those triangles. Thus, the averaged result of these multiple relaxes (or rather desired area to cover for each triangle, considering all possible poses) is the best mathematical representation of an actual surface area when considered over time.

In contrast to the aforementioned calculations of hypermesh, hypershape, hyperskin and hyperUV, classic pipelines are aimed at generating topology, skin weights and UVs that best describe the mesh in skin pose only, which is usually a T-pose or A-pose and is never achieved during animation.

At step 830, the SA module 126, as configured, calculates and stores inverse blend shapes and textures such as normal maps for a desired set of PDPs. In some embodiments, the desired set of PDPs may range from just two PDPs to all PDPs. In some embodiments, the desired set of PDPs is at least the convergence set. The inverse blend shapes and normal maps are hereinafter referred to as 'secondary animation states'. Inverse blend shape is a set of vertex offsets which, if applied before skin weight driven deformation, allows the vertex to achieve a prescribed location after skin is applied on top. Normal map refers to texture generated by comparing vertex normals of a reference asset (usually, a simulated high polygon mesh) and storing them in pixels mapped to the geometry of a low polygon/game mesh. A normal map is applied during render stage to fake direction of light reflected to simulate surface curved differently than the actual geometry.

Stated differently, inverse blend shapes refer to a set of vertex transforms which, if applied to a pose pre-skin deformation, allows the subsequently skinned vertices to achieve desired character space locations. The method of inverse blend shapes is typically used across multiple digital content creation tools and engines such as, for example, Maya. In embodiments, normal maps refer to textures generated which store, per pixel, the data of normal vector deviation between a low-resolution mesh and a high-resolution mesh, adding fake curvature to a lit model. A lit model refers to a 3D mesh that has light cast on it (in-game). This usually happens when a part of the mesh intersects a frustum of virtual light and based on angle between surface, light direction and other characteristics, a triangle or pixel receives a "lightness" value used for final rendering. The normal maps modify such angles to fake or approximate geometrical detail using pixel input.

The 'secondary animation states' may be equal to the number of PDPs. However, since PDPs can be replaced with pointers that can reduce them to any number of fewer PDPs (such as, for example, the convergence set of PDPs) and up to two PDPs, the 'secondary animation states' may also need to be calculated and stored for a fewer number of PDPs (such as, for example, the convergence set of PDPs) and down to two. The secondary asset for skipped PDPs can be covered with lerp of the 'secondary animation states'.

At step 832, the SA module 126 stores (in the database 120) the 'secondary animation states' per build, or per gaming level, or per platform. In some embodiments, the SA module 126 supports on-demand repackaging of blend shapes and texture data to fit a predetermined size, with a clear output of error. Instead of having arbitrary compression settings per asset, which introduce inconsistency and do not necessarily replicate asset importance, it is useful to define a goal (for example, megabytes, samplers, cycles) and pack based on precomputed utility per data point, presenting the best solution for given constraints.

As a non-limiting illustrative scenario, if there is a set of blend shapes and texture data such as, for example, for 500 PDPs and if the available disk size is 10 MB for a platform, then the SA module 126 automatically assesses how many of the 500 PDPs can be stored in the available disk size and determines a convergence set of PDPs for the 10 MB storage constraint. Thus, if there is a need to rebuild for the same platform with a different footprint goal, the SA module 126 chooses more or less data, but the chosen data parts will always be the best mathematical set to describe the best artistic result.

It is also possible to perform the same assessment per gaming level. For example, by default there may be a character using 500 PDPs but on a certain level the character may only be driving a car. In that case, the SA module 126 does not need to carry swimming and melee PDPs in as the gaming level is loaded.

At step 834, upon playback or at runtime, the stored 'secondary animation states' are invoked, by the SA module 126, with metadata (such as, but not limited to, the baked distance to body texture maps or any other data mentioned above, such as with respect to the graph structure data) either coming from PDPs of a graph structure or from animation curves for other systems (such as, Animation State Machines and Motion-Matching) and applied to mesh and shader in desired proportions or weights. The stored 'secondary animation states' data enables tweaking, per PDP, the game asset in order to fake the look and location of a high polygon asset. Vertices of hypermesh are offset using respective inverse blend shapes to reflect volume detail, and textures (normal maps) blended to reflect surface detail. For both vertices and pixels, the detail reflected is that which the high polygon asset achieved at a given PDP. It should be appreciated that while the graph structure is configured to natively store PDPs, their weights on other PDPs, and animation as a set of PDPs, for systems such as Animation State Machines or Motion-Matching, per-frame information about PDP effects would need to be stored for the SA module 126 to query. In embodiments, the effect of each stored 'secondary animation state' data needs to be saved per PDP or per animation frame. In some embodiments, this can be done as float curves or assigned as animation curves in the master game module 130, for example.

For assets, "deformations over time" are generated via 4D capture, hand-made sculpting, or physics simulation. In some embodiments, this is performed for concat reel. Subsequently, once final mesh with UVs and skinning is created, the deformations calculated earlier are applied to it per PDP. As a result, it is not possible to generate 'secondary animation states' data per PDP, meaning inverse blend shapes and textures such as normal maps, associated with a specific PDP. Per animation clip, a "weight" or effect of such PDP is stored (either per frame or as a set of interpolated points, for example). On animation playback, non-zero-effect PDPs are then suggested as sources of 'secondary animation states' data. This set of weights might include some PDPs which were replaced with references/pointers to other PDPs and can be changed (contracted) for optimization—for example, excluding PDPs having a weighting under 0.1. In some embodiments, the SA module 126 is configured to store 'secondary animation states' data of all PDPs for which it was generated on the engine side, and on game build/packaging only include the data referenced by respective animations. In some embodiments, it is also possible to force a certain maximum target size of 'secondary animation states' data per game, per level, per character, and the like. Therefore, in various embodiments, the data scope and storage locations vary—that is, in production, an excessive amount of 'secondary animation states' data is stored in content folders of the SA module 126. However, on packaging the game for debug, testing, release, or any other operation, a comparatively smaller set of data is packaged with other art assets.

In some embodiments, in order to incorporate secondary assets (into the animated character) such as props, for example, the SA module 126 overrides the collection of 'secondary animation states' and the corresponding proportions or weights with local static states designed for specific props at very low cost. These prop-based local overrides are added via a mix of automatically calculated masks, which are combined and animated at runtime. These masks are stored as vertex color, low resolution textures, or can even come from world context based on distance, for example. The case of creation and the lightweight nature of local overrides supports adding versatility for different loadouts or props.

As a non-liming exemplary scenario, assume that cowboy boots (a prop) are required to be added to the animated character. This prop comes in with its own mesh, skinning, and texture data. However, for different sets of pants in the game, specific folds may be enabled to be formed in case the cowboy boot is worn together with those pants. This means a blend shape for pants will override the 'secondary animation states' and related proportions or weights based on a "boot mask", and textures such as normal maps will be blended-in to fake the folds which the boot would generate. It is also possible to only generate the mesh and texture data for one set of pants and, storing it as cylindrical projection, re-project the displacement and pixels for another set of pants. This would produce lower quality but exceptional reusability and may serve for user-generated content or as base level data to be replaced when an artist has time to create appropriate meshes and textures for this other set of pants worn with cowboy boots. It should be appreciated that the SA module 126 supports easy scaling of multiple pants and multiple boots, or other assets combining.

In some embodiments, the SA module 126 is configured to support volumetric storage of data allowing not only character space offsets for the data, but also native cross asset reuse. For example, assume that for a combination of a pair of assets, A and B, respective blend shapes and textures (i.e., khaki pants tucked in boots) have been calculated. Now, asset C (a different type of pants, i.e. denim jeans) is added. In some embodiments, a "tucked" version for C and B combination can be generated and stored using simulation or sculpting or any other similar means. However, this route is not always possible (such as with the case of user generated content, or fast iteration with multiple assets). For such a case, the effect of B (boots) on A (khaki pants) is stored in voxel format relative to joints of the core skeleton (which both assets necessarily are skinned to). Such voxel data is then applied to a new incoming shape C (denim jeans) to "copy" the effect of being "tucked in". While the quality would be lower and certain repetitions in look would be noticeable, the ability to obtain fast compatibility without waiting for artistic input is in some cases immense.

In some embodiments, skin weight blends are also considered part of the 'secondary asset states' since the hypermesh is polygon mesh has a relatively small number of polygons ("low-poly"). In some embodiments, the SA module 126 supports GPU rendered subdivision surfaces directed towards subdividing geometry on demand, per face or polygon, in order to generate detail on demand for low-base meshes. The adaptive nature of the subdivision surfaces approach allows independent processing of each face or polygon of the base mesh using GPU, with subsequent tessellation, adding geometric detail based on ground truth in places where the density is low. This method renders an entire model as a single pass.

Persons of ordinary skill in the art would appreciate that a conventional character mesh pipeline relies on character vertices being assigned certain joints as transformation drivers. As the joints are displaced, the vertices inherit the displacement based on transformation offsets weighted to those of the joints.

In contrast, the method 800 of the present specification introduces a change in vertex location to accurately hold the mesh volume for the new joint pose. For example, in some embodiments, the skin pose is the pose in which the weighting is assigned. Thus, the closer such default is to a weighted average of possible poses to achieve, the lower the built-in error as the new vertex transforms are calculated from joints. The conventional character mesh pipelines are focused on skin poses being selected based on the criterion of a human preference to have something relatable, such as a relaxed stance. Instead, method 800 of the present specification proceeds with mathematical identification of a true minimal built in error pose, raising the quality of the animated result across all poses to achieve.

Improved Conformity of a Cloth or Garment Asset to a Character Body

In some embodiments, the SA module 126 supports an improved conforming process for a cloth or garment to the character body. Thus, if there is a character body and a piece of cloth or garment then, per PDP, the SA module 126 calculates the shortest distance from any point of cloth to any point of the character body. If the character body is now replaced with a different mesh (for example, a skeleton) of a different volume, the process of calculating the shortest distance is repeated. This enables the SA module 126 to be able to determine, per point of cloth, that the distance to the character body has changed and thereby supports a proper conforming process: for example, cloth points which used to have a short distance to body are supposed to 'cling' and so on the new body the SA module 126 instructs the vertex shader to push those points along their normal by the distance difference (if the distance of cloth to core body was 1, and a new distance is 5, the vertex shader is instructed to push by −4 to maintain the 'cling' but to a different volume). This is a non-limiting example of various modifications that can be meaningfully generated given the information of changed character body volume. Thus, the cloth or garment can be fitted to different body types and shapes at runtime. Since the distance to body per surface point is known, it can be factored into world force effects such as wind, or gravity, working together with the same 'secondary animation states' and the corresponding weights. Using world-space normals, the SA module 126 supports clinging upper parts of garment to skin, and sagging the lower parts, for example.

Fitting

Given a clothing piece, default character, and modified character, the SA module 126 supports proximity maps to be calculated and baked into vertex color, allowing for fitting of the same asset to a different physique. This is advantageous for scenarios such as, for example: cross-dressing of characters, oversized or undersized cloth, wet cloth clinging to body, wounds and dismemberment, things growing in or out of body under the cloth, or other clothing anomalies.

Texture Samplers

In some embodiments, the SA module 126 requires at least one extra sampler above a minimum number of texture samplers since texture effect is achieved by blending between at least two textures (or coordinates). Also, since lerp between 1 is redundant, no texture change would exist. Thus, at least one extra sample is required. It should be appreciated that this is not a limitation, rather an extra operation suggested by the math. It is assumed that the base texture or base set of UV coordinates may be a weighted collapse of all use cases, so when it is displayed at any pose it will reflect the best possible average. The base texture or base set of UV coordinates may be sampled when no PDPs bring an extra effect. Alternatively, in the case of the total affecting PDP weights summing up to less than 100%, the base for the rest is used. For example, a pose with only one PDP affecting it at 20% would lerp between 80% of base and 20% of that PDP.

Based on the number of extra samplers allowed, for example: a) 1 sampler can be used to blend in the prominent folds for prominent poses, but never cross-blend them (recommended for mobile distant LODs), b) 2 samplers can be used to cross-blend and thus achieve uninterrupted motion, but the result is quite linear like, walking straight (recommended for mobile average LODs), c) 3 samplers can be used to work with multiple dimensions and only use the most prominent three blends at any time, d) 4 samplers would suffice for good quality and versatility such as, for example, friendly to animated conditional/contextual changes such as shirt getting untucked, and e) more than 4 samplers may be considered for cases such as cinematics, or close-up playable characters.

In some embodiments, the following channel usage may be opted for packing: a) R+G=normal map (most influential), b) B: proximity (for dynamics effects), c) A: AO (Ambient Occlusion), curvature, or height (which can also be used to produce fake AO and curvature).

In some embodiments, data (such as, but not limited to, vertex offsets, skin weights, vertex distance to body and multiple formats available for storage such as, for example, vertex color, UVs, and textures) can be stored in morph targets (blend shapes) instead, if vertex color data is used in addition to position and possible tangent. Although more data is not typically stored in morphs, the option exists and may be useful, especially considering the low number of vertices compared to common (non-hypermesh) cases. In embodiments, the amount of each texture, or each morph, are represented in animation metadata based on current pose similarity to the chosen PDP.

Texture Packing

In some embodiments, the SA module 126 supports efficient packing of texture data. Once the set of textures, to be brought onto the character, is known, the SA module 126 packs them into one image, weighting the pixel size based on influence or importance of each PDP, and constructs an array of UV offsets for a pixel shader. Stated differently, baked textures are resized based on the effect or influence of each PDP, thereby giving more real estate to those used often. Thus, the PDP textures are packed in one image giving each PDP a resolution appropriate to its commonality, effect or influence. While the pixel sizes are suggested by commonality, effect or influence of each PDP on the corresponding mocap data, any number of other criteria may be incorporated, for example, artists may add a weight to make sure the "idle" always gets better resolution. Thus, artists may judge some movements to be more important than others and, therefore, the SA module 126 is configured such that it supports raising the fidelity of, say a PDP, based on their preference. The term "idle" refers to poses the character achieves while not receiving input from the player. An example is "stand on spot, breathing". Such poses are achieved more often than some others because players do give up control quite often to rotate camera, look at some location, think about tactics to solve a puzzle, view or manipulate positions, check inventory or other "character idle" functions. The final percentage of screen time of each PDP for each player cannot be predicted, but it can be pre-emptively assumed that some 'secondary animation states' data (that is, inverse blend shapes and textures such as normal maps) will be invoked more often than others, and, therefore, assign it higher resolution/lower compression. The calls of each 'secondary animation states' data point during development can be tracked and accumulated to get actual metrics, and use those for final game packaging.

Figure 11:
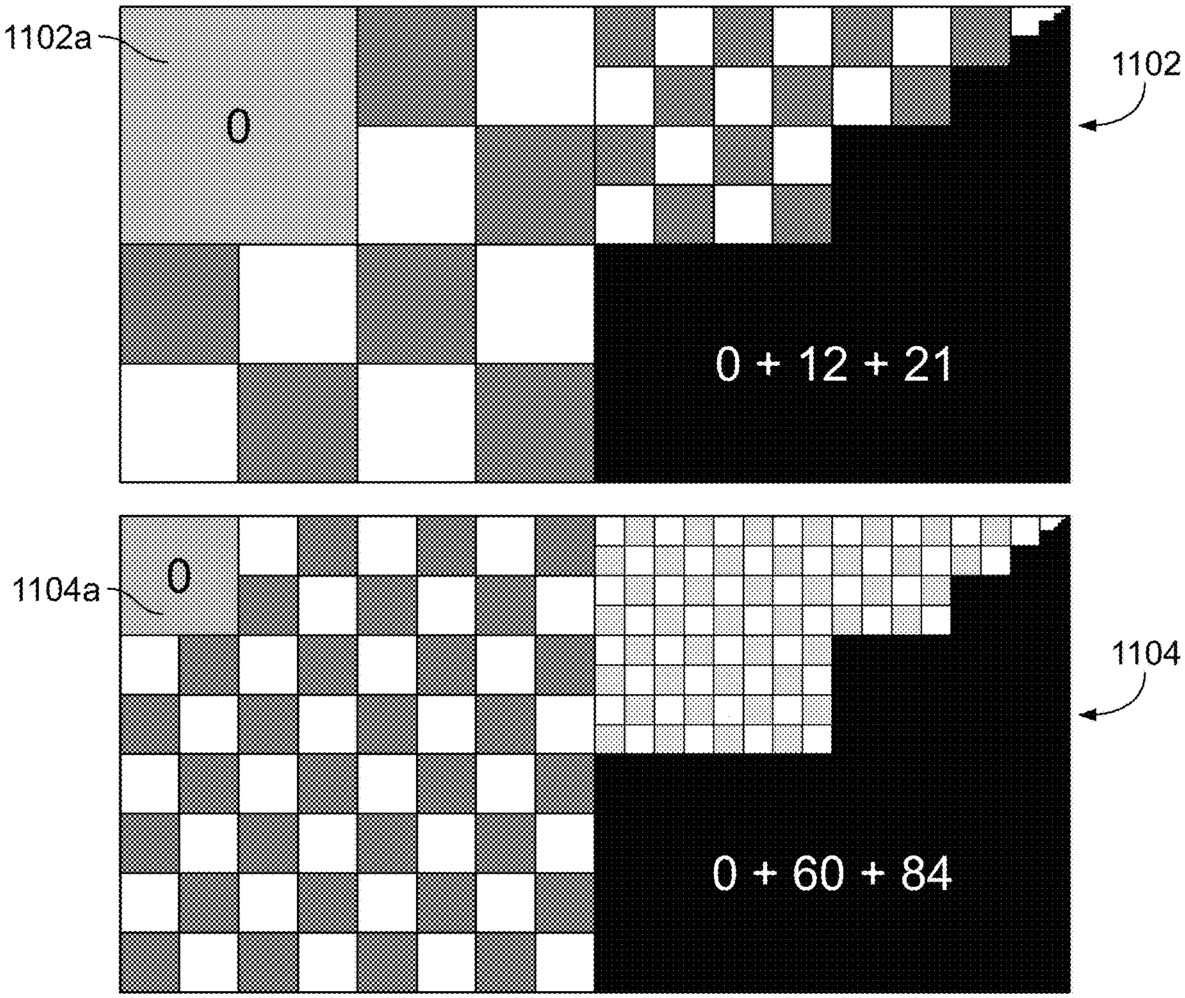
FIG. 11 is a diagram showing an exemplary first packing and second packing of texture data, in accordance with some embodiments of the present specification.

FIG. 11 shows exemplary first packing and second packing of texture data, in accordance with some embodiments of the present specification. The first texture data packing 1102 corresponds to one base PDP, 12 common PDPs and 21 unique PDPs. The second texture data packing 1104 corresponds to one base PDP, 60 common PDPs and 84 unique PDPs. Areas 1102*a*, 1104*a* marked 'zero' store the weighted average for fall back. The weighted average is effectively a 'rest state' of deformation with no prominent features, which can be achieved by averaging out all 'secondary animation states' calculated over the motion.

Morph Packing

The number of principal morphs (blend shapes) is disconnected from the number of principal textures, since it makes use of different resources. Exemplary cases can be considered with 32 morphs and 2 textures, or vice versa. In some embodiments, like with textures, the SA module 126 supports customization of how many morphs should be queried in total or cap the number to queries per frame.

Modifiers

In some embodiments, the SA module 126 supports collapsing multiple modifiers into a single modifier for performance reasons, or even baking into the base geometry to nullify extra footprint(s). For an asset, a number of modifiers can be either baked into base geometry/textures for each specific use case, or stored as separate override morphs/pixels. For asset combination scenarios, an asset may receive an effect from other assets it is combined with. For example, a set of pants X can be worn with knee pads A, cowboy boots B, or a gun holster C. On the artistic side, the corresponding deformations for the pants X can be generated and thus the masks of effects of A, B and C, respectively. If then, on some level, a character is spawned with individual X+A, X+B, or X+C, to make use of the possible versatility, the assets may not necessarily need to be collapsed. However, multiple objects affecting the pants X in their combination (such as X+A+B+C) imply extra sampling for deformed areas. In this case, it is preferred to collapse vertex deformations (blend shape) of the pant X resulting from A+B+C combination into one, and do the same with texture maps.

With this approach merging assets describing effecting of multiple modifiers into one asset, and gradient masking of the effect, the SA module 126 supports adding multiple modifiers simultaneously while still benefiting from initial simulation.

Figure 12:
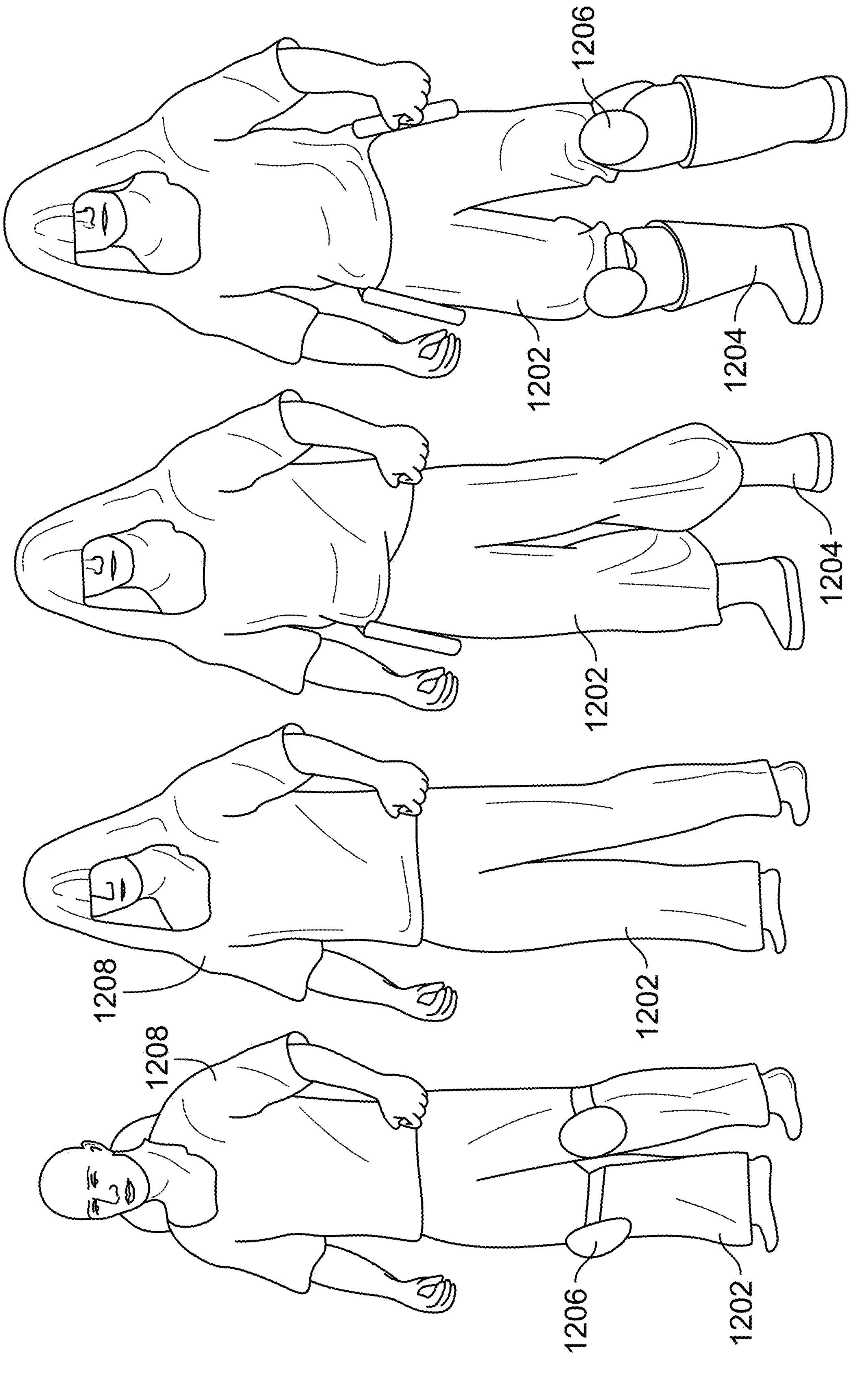
FIG. 12 is an illustration of pants having multiple types of boots used both in conjunction with kneepads and without knee pads, in accordance with some embodiments of the present specification.

As shown in FIG. 12, pants 1202 have multiple types of boots 1204 used both in conjunction with kneepads and without knee pads 1206. Additional secondary assets such as, for example, pockets, holsters, belts, and other accessories can be added similarly. Shirt 1208 may have other type of modifiers added: for example, in defining the "hoodie down", the option to blend in a different hyperskin set of weights, is available if desired. The tucking of the shirt is a mask that can make use of multiply effect at runtime to control whether the shirt is tucked at front, back, left, right, or possibly have animated tucking/untucking.

Dynamic Effects

Force-driven deformations (gravity, drag and spring), and static/dynamic object driven deformations are resolved using known methods in vertex shading such as, for example, passing a wind vector into the vertex shader and applying the result to offset the vertices into a desired direction, at a desired magnitude. However, there are some substantial differences from conventional solvers, as follows: hypermesh being lowpoly allows for lower cost operations, in case of animated proximity maps, information is known about freedom to deform at any point in space or time, since body parts are moving inside clothing parts independently, the range of available motion is much more realistic, gravity and drag are baked into the set of 'secondary animation states' data and, while they could be taken out on offline, it makes sense to just counter-compensate for them, if required. That is, the drag of assets such as pants or the gravity therefrom are already in effect on the assets, since these forces affected the simulation that was used to produce the core set. Applying extra gravity at runtime would double the effect. However, in cases where the game actively changes the "default" world forces, for example zero-G levels, the default baked in G force can be counteracted.

For full body effects (ragdoll), a plurality of routes is available, as follows: cheap comparison on minimal joint set can be performed to identify the best PDPs to apply (does not have to be per frame, essentially, low investment of feeding on existing data/blend space); force-driven deformations may be applied per body part or stored as a voxel grid (high investment/high quality output); revert to default 'secondary animation states' data plus force-driven body space deformation (near-zero cost); resolving per body part (transforming a graph structure into per-body-part space and feeding off closest relative PDP).

It should be appreciated that effectively, there are an unlimited number of poses that the physics simulation can achieve. Therefore, in embodiments, it is advantageous to determine as to which specific poses would be most beneficial to generate 'secondary animation states' data for. It should also be appreciated that any time the character goes ragdoll during gameplay, the resulting poses can be stored, and the resulting data can be parsed just like an extra animation clip.

Scalability/Iterating

While existing PDPs are defined from basic data (for example, locomotion), the capacity of motion grows with each new animation clip added. Basic data refers to animations that are present from early stages of a game, usually representing the most commonly expected mechanics (so, for some games, it may be running, for others it may be driving, swimming, or other more basic motions or movements). More intricate special case data is added as the game evolves.

For all new mocap data, a plurality of exemplary steps involved may be as follows: the new mocap data is distilled and corresponding new PDPs are generated; the new PDPs are compared to the existing set of PDPs and references are applied where possible; for the new mocap data not well-represented in the existing PDPs (based on, pose comparison cost analysis output), a request for data is formulated (since some similarity is bound to exist, an educated guess is made to provide a good starting ground for the artist, the more mocap data is added into the system, the less of it is likely to be unique and require artistic attention). Stated differently, the animation data is input or fed directly to the game engine, and the following happens on asset import to the game engine: a) motion is segmented using force curve, b) identified PDPs are compared to the pre-existing set, c) if a PDP is found which is not well represented by the pre-existing set, for example having the combined effect of the pre-existing PDPs at 10% while the artist-set threshold is "at least 50%", the corresponding PDP is communicated as one needing 'secondary animation states' data. The communication could be, for example, a log file generated on import, or an auto-generated Jira task, email, etc. In some embodiments, it is also possible that such log file would exist permanently and receive updates over time, so the artists can periodically check it and reason as to when to stage another set of updates, for example once every three months or once every 100 "fails".

Thus, new poses coming from new mocap data do not update the concat reel and do not receive unique 'secondary animation states' data. Instead, the new poses are compared to the pre-existing PDPs only and inherit pre-existing 'secondary animation states' data only. This restrains the growth of the footprint, at the cost of possibly not representing new data at the same level of fidelity.

For modifiers, the "ground truth" highest quality (that is, a representation of deformation per specific pose at highest quality available; for example, a 4D scan of result of simulation performed in software such as Houdini or Marvelous Designer) would always be using specific modifier with specific clothing or garment piece and storing the result. However, for video games, this approach is not followed, and a fake one is preferred instead. Therefore, in some embodiments, the SA module 126 supports storing the modifier's effect as volumetric deformation, and texture-based effect as a wrapper to be baked into specific UVs. The fake cases are those where the asset is not deformed based on best possible data but instead inherits one or more deformations done in a more general way—for example, bicep bulging can involve careful sculpting of the mesh surface, baking of corresponding textures, material adjustments to add skin tone modification and veins bulging, or other bicep bulge characteristics, and yet, it is typically done via a single joint offset.

Scalability/Costs

In accordance with aspects of the present specification, instead of working on one specific set of assets, the SA module 126 supports a footprint to be defined on case-by-case basis during build. Since the tradeoff of megabytes/cycles is mostly versatility not quality, the SA module 126 supports build for both mobile and console cut-scene levels, and anything in between. This does require additional work on data bake and management, but in return allows a high degree of control and stable quality output regardless of the choice.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A computer-implemented method of generating a graph structure configured to enable a synthesis of character motion in a multi-player online video game, the method comprising:

- receiving motion capture data;
- identifying a plurality of dominant poses from the motion capture data;
- comparing each dominant pose of the plurality of dominant poses against each remaining pose of the plurality of dominant poses;
- grouping the dominant poses to form one or more master pose nodes, wherein the dominant poses in each of the one or more master pose nodes are indicative of similar motion over a time window;
- adding a plurality of transitions based on successive dominant poses present in each master pose node, wherein each of the plurality of transitions represents pairs of dominant poses that are sufficiently similar for selection in an animation sequence;
- calculating shape, mesh, UVs and skin corresponding to a secondary asset associated with the character;
- calculating and storing inverse blend shapes and normal maps for the plurality of dominant poses;
- storing the inverse blend shapes and normal maps per build, per gaming level or per platform; and
- invoking and applying, at runtime, the stored inverse blend shapes and normal maps with metadata from the plurality of dominant poses to mesh and shader in desired proportions or weights.

2. The computer-implemented method of claim 1, wherein the identifying the plurality of dominant poses comprises sampling the motion capture data to determine poses associated with different positions along a force curve and wherein those poses corresponding to maximum and minimum values of the force curve are identified as said plurality of dominant poses.

3. The computer-implemented method of claim 1, wherein the comparison is based on a similarity metric calculated over a fixed time window centered at each dominant pose.

4. The computer-implemented method of claim 3, wherein the similarity metric is a comparison cost value.

5. The computer-implemented method of claim 1, wherein each of the plurality of transitions comprises a Root transform offset and a duration.

6. The computer-implemented method of claim 1, wherein the motion capture data is derived from the plurality of dominant poses by extrapolating a force curve across the plurality of dominant poses.

7. The computer-implemented method of claim 1, further comprising generating motion in the multi-player online video game at runtime by applying one or more of the plurality of dominant poses from the one or more master nodes and by applying one or more of the plurality of transitions that match a plurality of control parameters, wherein the plurality of control parameters define a desired motion of a character in the multi-player online video game.

8. The computer-implemented method of claim 1, further comprising storing data for each of the one or more master pose nodes, wherein the data comprises at least one of dominant poses, weights associated with each of the dominant poses, poses preceding said each of the one or more master pose nodes, a cost of blending said preceding poses, poses succeeding each of the one or more master pose nodes, costs of blending said succeeding poses, and one or more metadata.

9. The computer-implemented method of claim 1, wherein calculating the mesh comprises:

- sampling a high polygon cloth mesh by either using vertices of the high polygon cloth mesh or if the cloth mesh has UVs then using its pixels mapped to geometry;
- for each dominant pose, determining a geometric curvature per sample;
- collapsing the geometric curvature at the plurality of dominant poses to a single value per sample; and
- generating a low polygon game mesh using the single value.

10. The computer-implemented method of claim 9, wherein calculating the shape and skin comprises:

- determining, for each vertex of the mesh, closest vertices of body mesh at each dominant pose;
- eliminating all body mesh vertices, at each dominant pose, that are farther away than a maximum distance of any mesh vertex to any body mesh vertex in order to generate a relevant subset of body vertices;
- accumulating, for each mesh vertex at each dominant pose, joint weights of each body mesh vertex in the relevant subset of body mesh vertices and weighting each result;
- storing an offset of mesh vertex from respective joints as a vector in respective joint space with weight;
- collapsing all the weights in order to determine, for each mesh vertex, a set of joints and weights affecting it and an offset from each; and
- determining a location for each mesh vertex by taking a weighted average of offsets from joints at skin pose.

11. The computer-implemented method of claim 10, wherein the UVs are calculated by:
generating UV seams for the mesh; and
relaxing the generated UVs for each dominant pose.

12. The computer-implemented method of claim 1, wherein when the stored inverse blend shapes and normal maps are applied, vertices of the mesh are offset using respective inverse blend shapes to reflect volume detail and normal maps are blended to reflect surface detail.

13. A system of generating a graph structure configured to enable a synthesis of character motion in a multi-player online video game, the system comprising:
at least one game server in communication with a plurality of player client devices, wherein the at least one game server has a non-volatile memory for storing a plurality of programmatic code which, when executed, cause a processor to:
receive motion capture data;
identify a plurality of dominant poses from the motion capture data;
compare each dominant pose of the plurality of dominant poses against each remaining pose of the plurality of dominant poses;
group the dominant poses to form one or more master pose nodes, wherein the dominant poses in each of the one or more master pose nodes are indicative of similar motion over a time window;
add a plurality of transitions based on successive dominant poses present in each master pose node, wherein each of the plurality of transitions represents pairs of dominant poses that are sufficiently similar for selection in an animation sequence;
calculate shape, mesh, UVs and skin corresponding to a secondary asset associated with the character;
calculate and store inverse blend shapes and normal maps for the plurality of dominant poses;
store the inverse blend shapes and normal maps per build, per game level or per platform; and
invoke and apply, at runtime, the stored inverse blend shapes and normal maps with metadata from the plurality of dominant poses to mesh and shader in desired proportions or weights.

14. The system of claim 13, wherein said identifying the plurality of dominant poses comprises sampling the motion capture data to determine poses associated with different positions along a force curve and wherein those poses corresponding to maximum and minimum values of the force curve are identified as said dominant poses.

15. The system of claim 13, wherein the comparison is based on a similarity metric calculated over a fixed time window centered at each dominant pose.

16. The system of claim 15, wherein the similarity is a comparison cost value.

17. The system of claim 13, wherein each of the plurality of transitions comprises Root transform offset and a duration.

18. The system of claim 13, wherein the motion capture data is derived from the plurality of dominant poses by extrapolating a force curve across the plurality of dominant poses.

19. The system of claim 13, wherein the plurality of programmatic code, when executed, further cause the processor to generate motion in the multi-layer online video game at runtime by applying one or more of the plurality of dominant poses from the one or more master nodes and by applying one or more of the plurality of transitions that match a plurality of control parameters, wherein the plurality of control parameters define a desired motion of a character in the multi-player online video game.

20. The system of claim 13, further comprising storing data for each of the one or more master pose nodes, wherein the data comprises at least one of dominant poses, weights associated with each of the dominant poses, poses preceding said each of the one or more master pose nodes, a cost of blending said preceding poses, poses succeeding each of the one or more master pose nodes, costs of blending said succeeding poses, and one or more metadata.

21. The system of claim 13, wherein calculating the mesh comprises sampling a high polygon cloth mesh by either using vertices of the high polygon cloth mesh or if the cloth mesh has UVs then using its pixels mapped to geometry; for each dominant pose, determining geometric curvature per sample; collapsing the geometric curvature at the plurality of dominant poses to a single value per sample; and generating a low polygon game mesh using the single value.

22. The system of claim 21, wherein calculating shape and skin comprises determining, for each vertex of the mesh, closest vertices of body mesh at each dominant pose; eliminating all body vertices, at each dominant pose, that are farther away than a maximum distance of any mesh vertex to any body vertex in order to generate a relevant subset of body vertices; accumulating, for each mesh vertex at each dominant pose, joint weights of each body vertex in the relevant subset of body vertices and weighting each result; storing an offset of mesh vertex from respective joints as a vector in respective joint space with weight; collapsing all the weights in order to determine, for each mesh vertex, a set of joints and weights affecting it and offset from each; and determining the location for each mesh vertex by taking weighted average of offsets from joints at skin pose.

23. The system of claim 22, wherein calculating the UVs comprises generating UV seams for the mesh; and relaxing the UVs for each dominant pose.

24. The system of claim 13, wherein when the stored inverse blend shapes and normal maps are applied, vertices of the mesh are offset using respective inverse blend shapes to reflect volume detail and normal maps are blended to reflect surface detail.

* * * * *